United States Patent [19]
Ito et al.

[11] Patent Number: 5,465,370
[45] Date of Patent: Nov. 7, 1995

[54] ELECTRONIC MEETING SUPPORT SYSTEM

[75] Inventors: Takafumi Ito, Tokyo; Kenji Suzuki, Soka, both of Japan; Takayuki Ikeda, Irving, Calif.; Fumio Oyama, Tokyo, Japan; Walt Mazur, Laguna Hills, Calif.

[73] Assignees: Kabushiki Kaisha Toshiba, Kawasaki, Japan; Toshiba America Information Systems Inc., Calif.

[21] Appl. No.: 826,846

[22] Filed: Jan. 28, 1992

[51] Int. Cl.⁶ .................................................. G06F 13/00
[52] U.S. Cl. ...................................................... 395/200.04
[58] Field of Search ............................. 345/2; 370/62; 379/53; 395/800, 325, 200, 800

[56] References Cited

U.S. PATENT DOCUMENTS

| | | | |
|---|---|---|---|
| 4,686,698 | 9/1987 | Tompkins et al. | 379/53 |
| 4,710,917 | 12/1987 | Tompkins et al. | 370/62 |
| 4,847,829 | 7/1989 | Tompkins et al. | 370/62 |
| 4,939,509 | 7/1990 | Bartholomew et al. | 345/2 |
| 4,975,834 | 12/1990 | Xu et al. | 395/800 |
| 5,014,267 | 5/1991 | Tompkins et al. | 370/62 |
| 5,199,029 | 3/1993 | Hessler et al. | 370/62 |

*Primary Examiner*—Alyssa H. Bowler
*Assistant Examiner*—Dan Fiul
*Attorney, Agent, or Firm*—Finnegan, Henderson, Farabow, Garrett & Dunner

[57] ABSTRACT

Interfaces of a LAN are arranged in a plurality of terminals, and a controller of a large size monitor, and the terminals and the controller are connected via the LAN. A means for transmitting information input at each terminal to the monitor controller via the LAN in real time is arranged in the terminals, and the monitor controller. A means for simultaneously displaying the transmitted information on the monitor is arranged in the monitor controller. A means for transmitting data displayed on the monitor from the monitor controller via the LAN is arranged. A plurality of VRAMs capable of displaying screens of the terminals to be overlaid on each other is arranged in each terminal. One of the VRAMs is assigned to public data, and another one is assigned to display data only for the terminal.

16 Claims, 38 Drawing Sheets

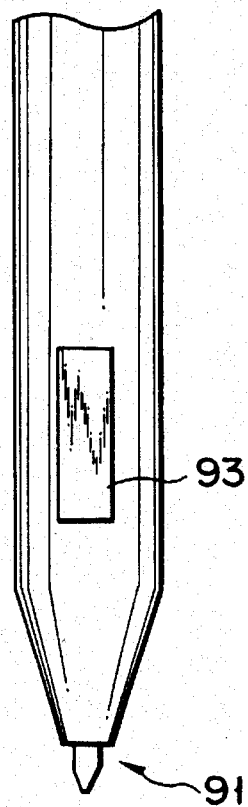
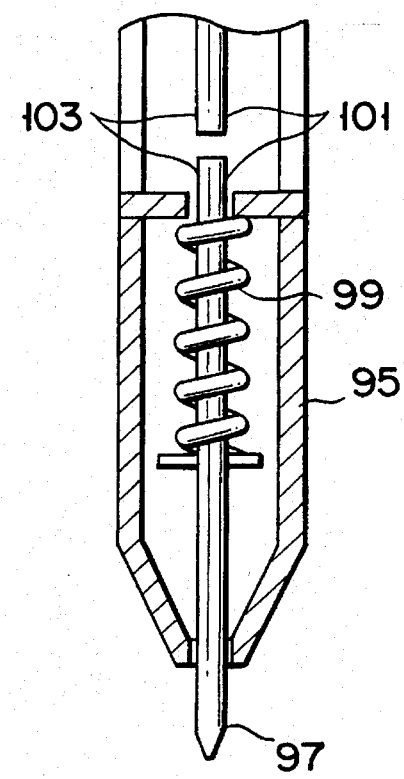
F I G. 6A    F I G. 6B

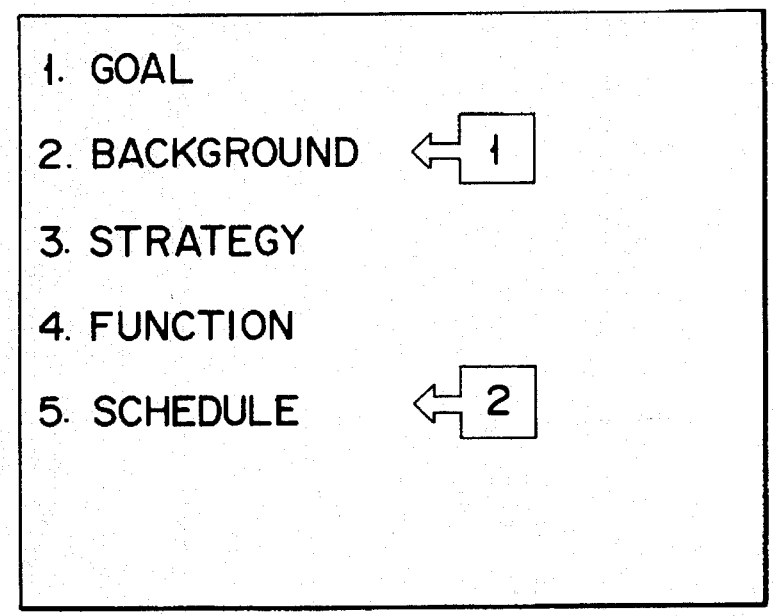
F I G. 11A
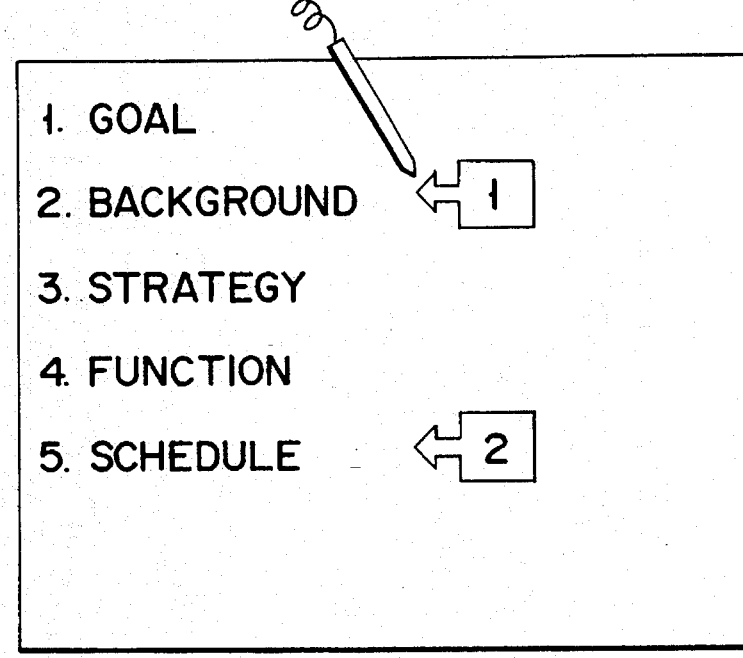
F I G. 11B

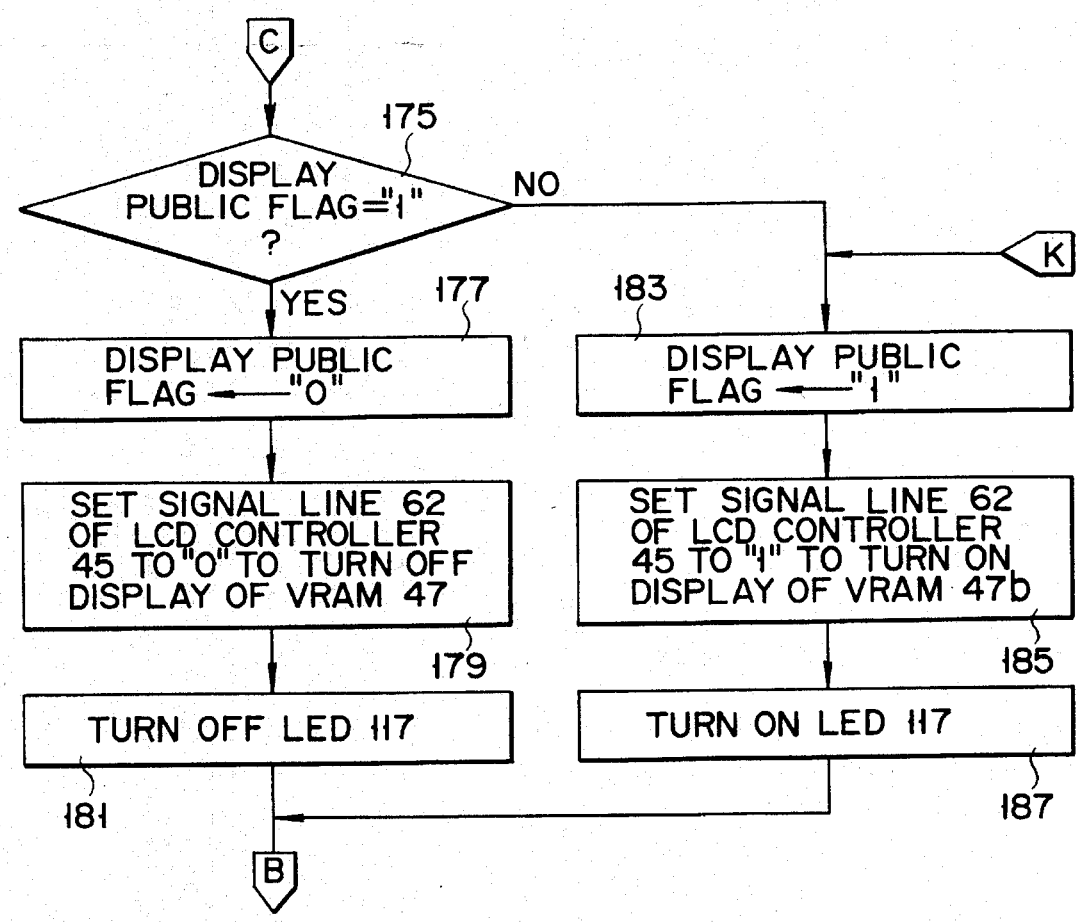
F I G. 12D

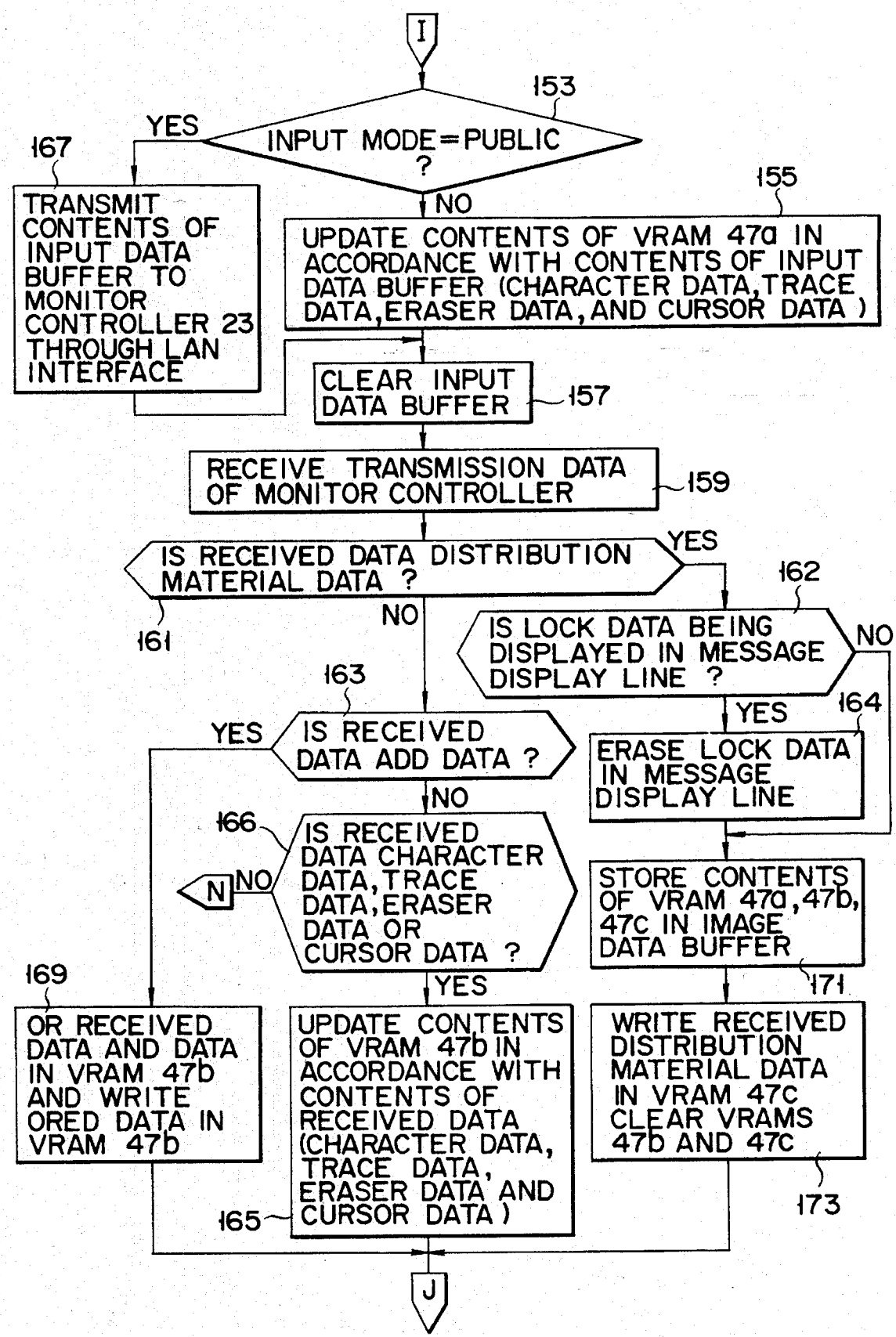
F I G. 15C

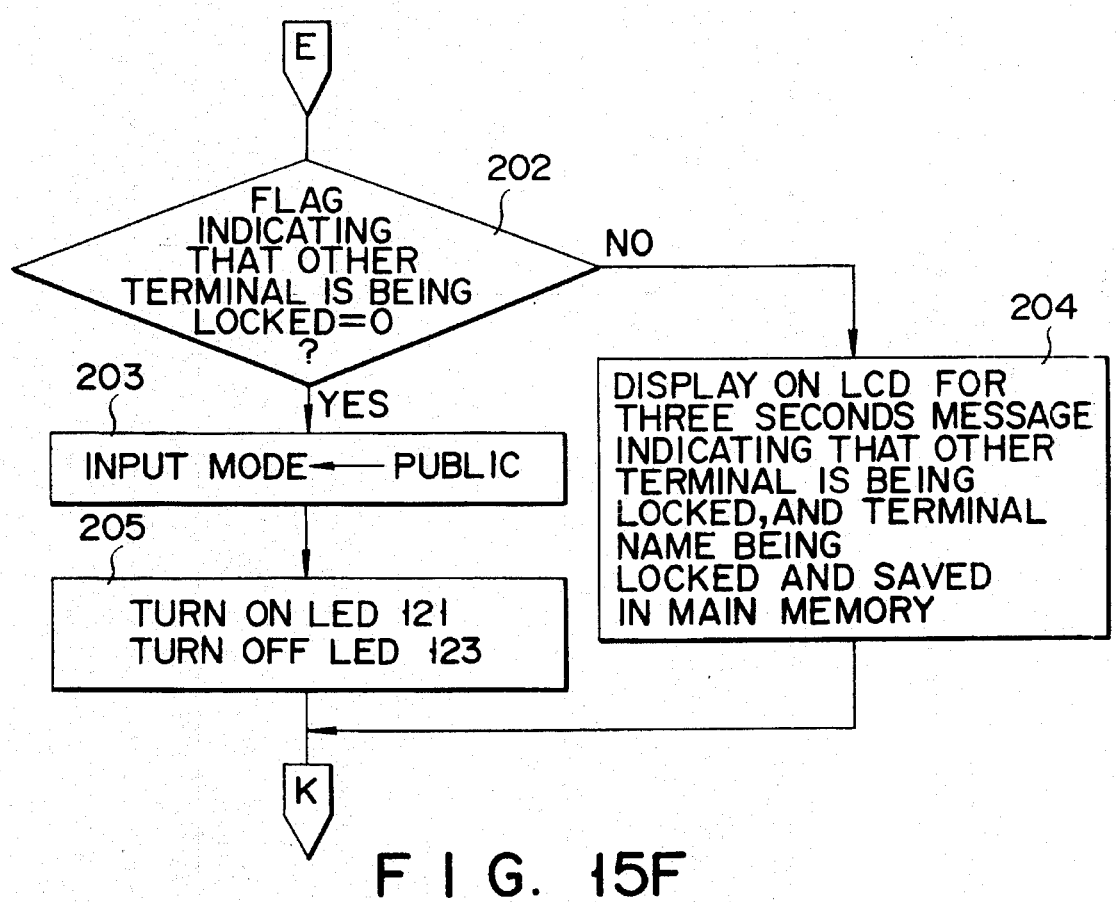
F I G. 15F
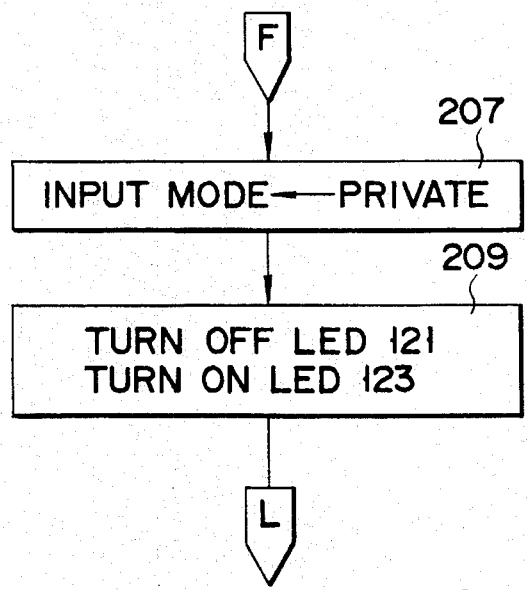
F I G. 15G

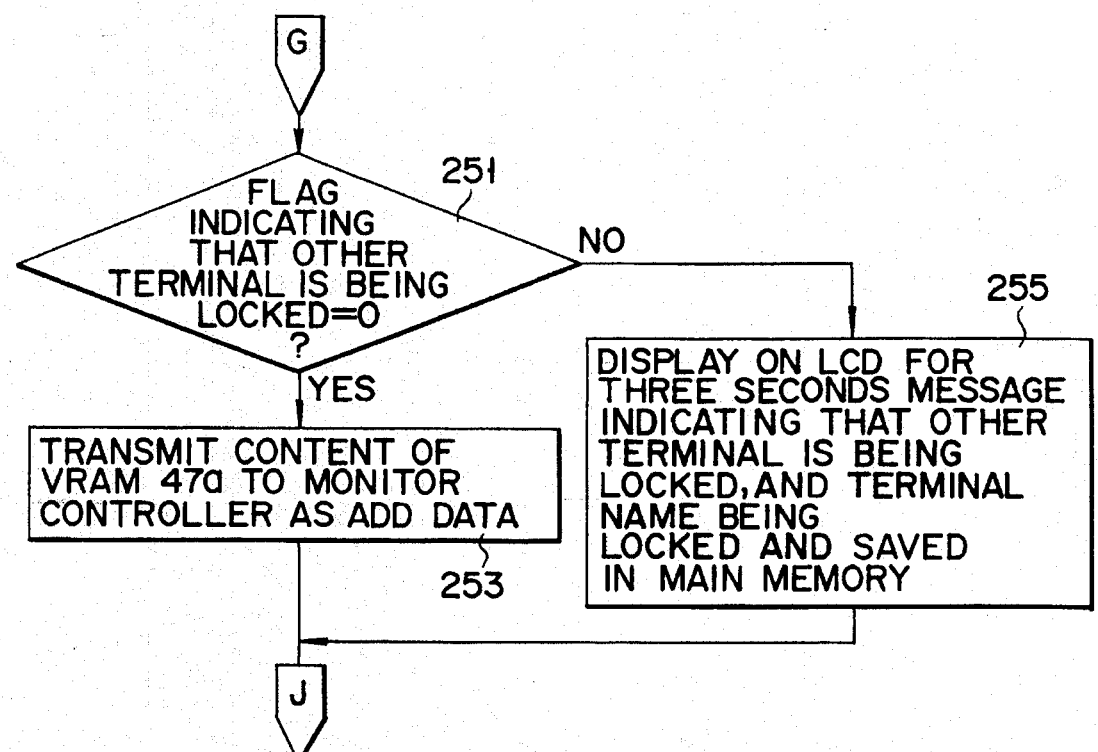
F I G. 15H
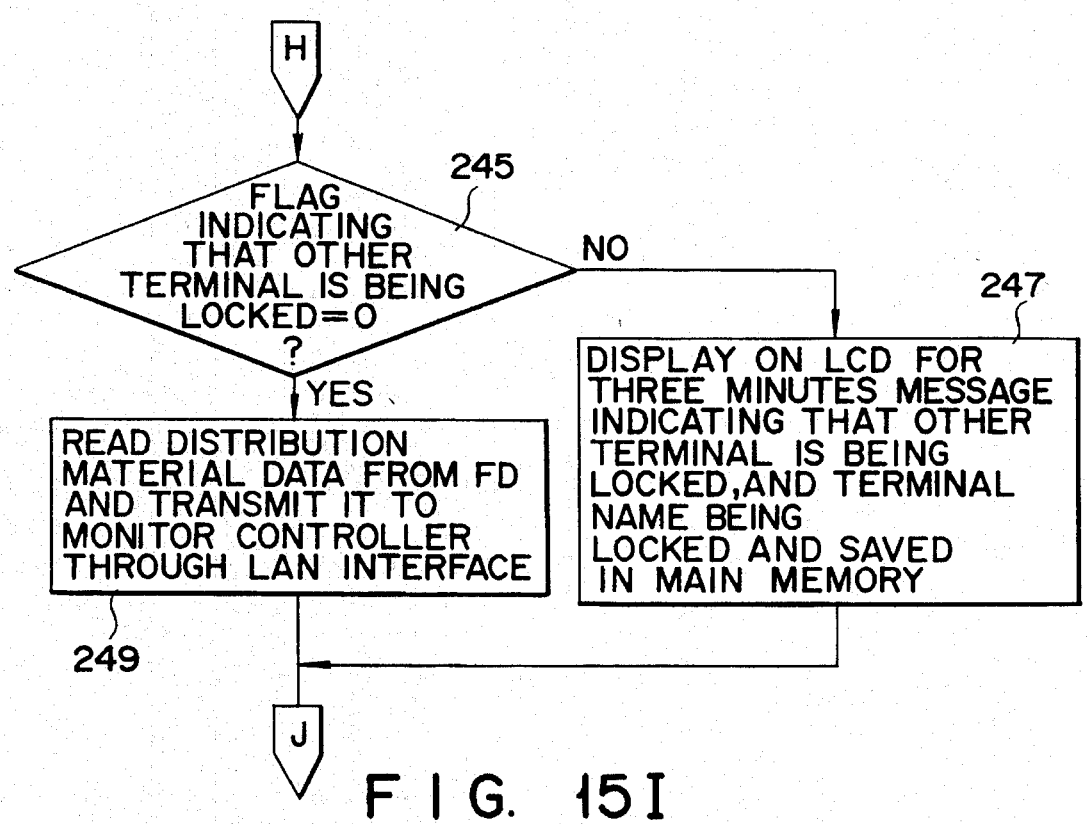
F I G. 15I

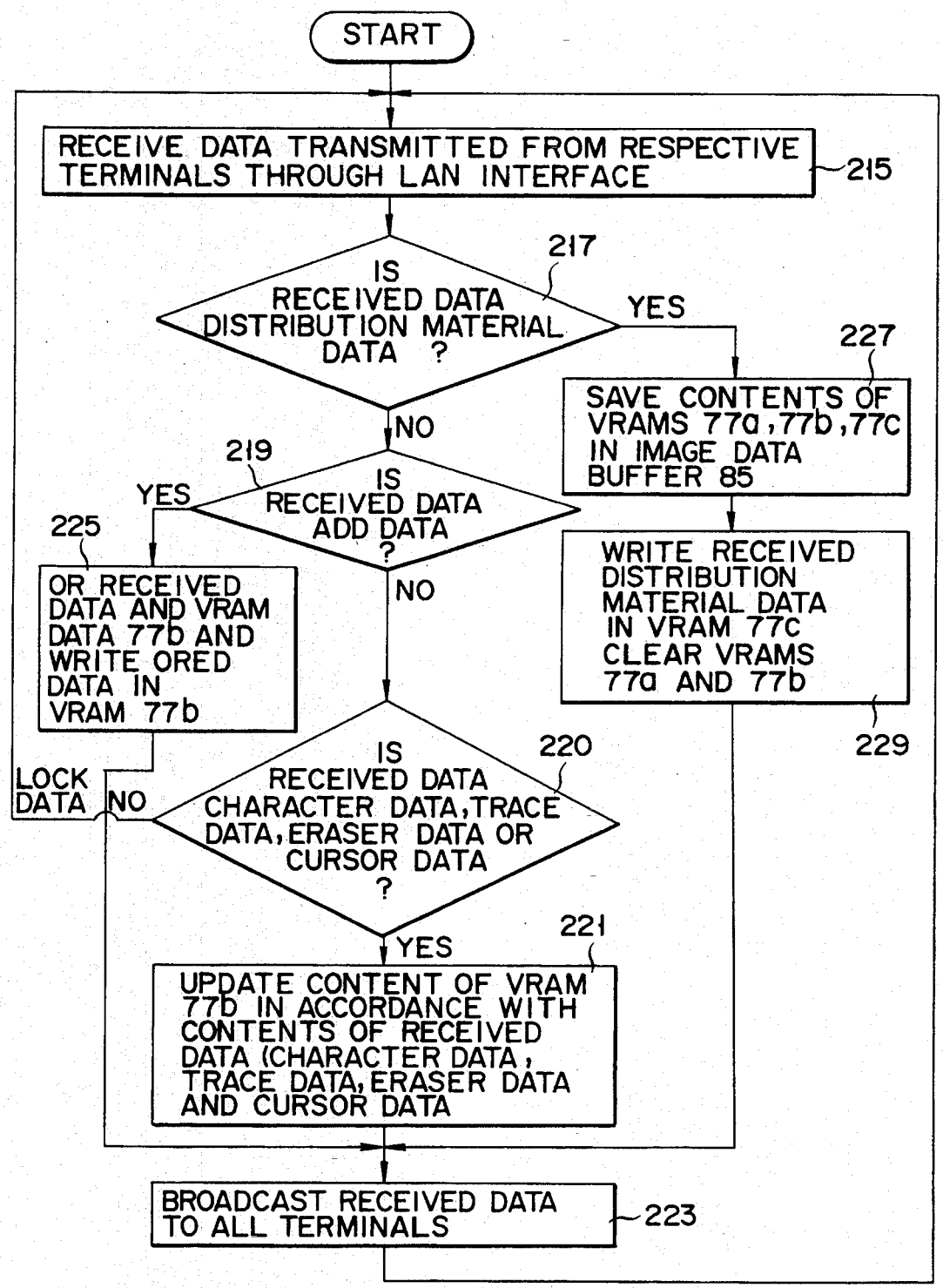
F I G. 16

ELECTRONIC MEETING SUPPORT SYSTEM

BACKGROUND OF THE INVENTION

1. Field of the Invention

The present invention relates to an electronic meeting support system for realizing an electronic meeting and presentation with improved operation efficiency.

2. Description of the Related Art

In recent years, electronic meetings or presentations utilizing work stations Or personal computers tend to be made with improved operation efficiency. There is known among meeting support systems, a system in which a personal computer is connected to a large size screen via a communication line, and a screen of a personal computer is displayed on the large size screen to provide a function of an overhead projector (OHP) or an electronic black board.

FIG. 1 shows a conventional meeting support system. The meeting support system shown in FIG. 1 comprises a large size monitor 1, serving as an alternative to an OHP or a black board, for enlarging and displaying various data, a monitor controller 3, having a serial synchronization communication interface, for controlling the large size monitor 1 to display various data, a personal computer main body 5 having a serial synchronization communication interface, and connected to the monitor controller 3 via a serial synchronization communication line 7, a CRT display device 9 used as a monitor when the personal computer is operated, a keyboard 11 serving as an input device of the personal computer, a mouse 13 serving as another input device of the personal computer, and a floppy disk drive (FDD) 15 serving as an external storage device of the personal computer. Display data from the personal computer is transmitted to the monitor controller via the serial synchronization communication line 7, and is then displayed on the large size monitor 1. In FIG. 1, a participant of a meeting or a presenter in a presentation loads meeting material data or presentation material data, created in advance using another personal computer and stored in a floppy disk (FD), from the FDD 15 to the personal computer main body 5, and explains or presents it to other participants by displaying the material data on the large size monitor 1 via the line 7 and the monitor controller 3.

New data input by the keyboard 11 and the mouse 13 during explanation or presentation can be stored in the FDD 15 as a memorandum.

However, in the conventional system, since only one terminal device (personal computer) can operate the large size monitor 1, the number of participants, who can display his or her data on the large size monitor, or can input or display his or her opinion there, is limited to one at a time. For this reason, a plurality of participants cannot simultaneously input or display their opinions on the large size monitor. Therefore, when a plurality of participants are required to input and display their opinions like in discussion, the meeting support system cannot effectively function.

SUMMARY OF THE INVENTION

It is an object of the present invention to provide a meeting support system in which a plurality of terminals and a large size monitor are connected via a local area network (LAN), so that a plurality of participants of a meeting can operate their terminals to input and display their data on the large size screen in real time, thus allowing an efficient operation of a meeting.

According to the first aspect of the present invention, an information processing system comprises: a plurality of information processing apparatuses each comprising an input device, a display device, and a communication device for performing data communication with other information processing apparatuses; a data communication path for performing data communication among the communication devices of the plurality of information processing apparatuses; means for transmitting information input by the input device of an arbitrary one of the plurality of information processing apparatuses to all the information processing apparatuses in real time via the data communication path; and means for displaying the transmitted information on the display devices of the information processing apparatuses.

According to the second aspect of the present invention, an information processing system comprises: a plurality of information processing apparatus each comprising an input device, a display device, and a communication device for performing data communication with other information processing apparatuses; an information display apparatus comprising a display device, and a communication device for performing data communication with the information processing apparatuses; a data communication path for performing data communication among the communication devices in the plurality of information processing apparatuses, and the communication device of the information display apparatus; means for transmitting information input by the input device of an arbitrary one of the plurality of information processing apparatuses to all the information processing apparatuses, and the information display apparatus in real time via the data communication path; and means for displaying the transmitted information on the display devices of the information processing apparatuses and the display device of the information display apparatus in real time.

According to the present invention, LAN interfaces are arranged in a plurality of terminals, and in a controller for a large size monitor, and these terminals and the controller are connected via a LAN. In addition, means for transmitting data input at each terminal to the monitor controller via the LAN in real time is arranged in the terminals and the monitor controller. Furthermore, since means for simultaneously displaying the transmitted information on the large size monitor is arranged in the monitor controller, input data from the terminals can be simultaneously displayed on the large size monitor in real time.

Moreover, means for transferring data displayed on the large size monitor from the monitor controller to the terminals via the LAN is arranged, so that the data displayed on the screen of the large size monitor can be displayed on the screens of the terminals or can be stored in storage devices of the terminals.

A plurality of VRAM screens which can be overlaid on a monitor of each terminal, and can display data is arranged on each terminal, so that one of these VRAM screens is used for public data (i.e., data displayed on the large size monitor), and the other one is exclusively used for displaying data of the terminal. As a result, public data and individual data can be displayed to be overlaid each other. When data on the screens are to be stored in a storage device of each terminal, since these data can be individually stored, only public data or only individual data can be displayed on each terminal.

According to the meeting support system of the present invention, since a plurality of terminals can simultaneously input and display data on a public large size screen, a plurality of participants can easily present, explain or comment on their opinions like in a discussion, thus improving operation efficiency of a meeting.

Since data displayed on the public large size screen is also displayed on a monitor of each terminal, all the participants can easily see fine data on the public large size screen. Furthermore, each participant can store public data on the large size screen directly or together with his or her own data in a storage device of each terminal as a meeting memorandum or proceedings.

In each terminal, since a VRAM screen for public data, and a VRAM screen for private data are separated, only the public data, or only the private data can be easily accessed. In addition, a participant can input and display data not to be public data, i.e., not to be presented to other participants, to be overlaid on public data, and can create his or her own memorandum.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6A is a side view showing a pen shaft switch of a pen 39 shown in FIG. 2, and FIG. 6B is a sectional view showing structure of a pen tip switch;

FIGS. 11A through 11C are views showing the second embodiment of the present invention, in which FIG. 11A shows a display screen of a public large size monitor, FIG. 11B shows a display screen of a first terminal, and FIG. 11C shows a display screen of a second terminal;

FIGS. 12A through 12I are flow charts showing operations of a terminal in the second embodiment;

FIGS. 15A through 15K are flow charts showing operations of a terminal in the third embodiment;

FIG. 16 is a flow chart showing an operation of a monitor controller in the third embodiment.

DETAILED DESCRIPTION OF THE PREFERRED EMBODIMENTS

Figure 1:
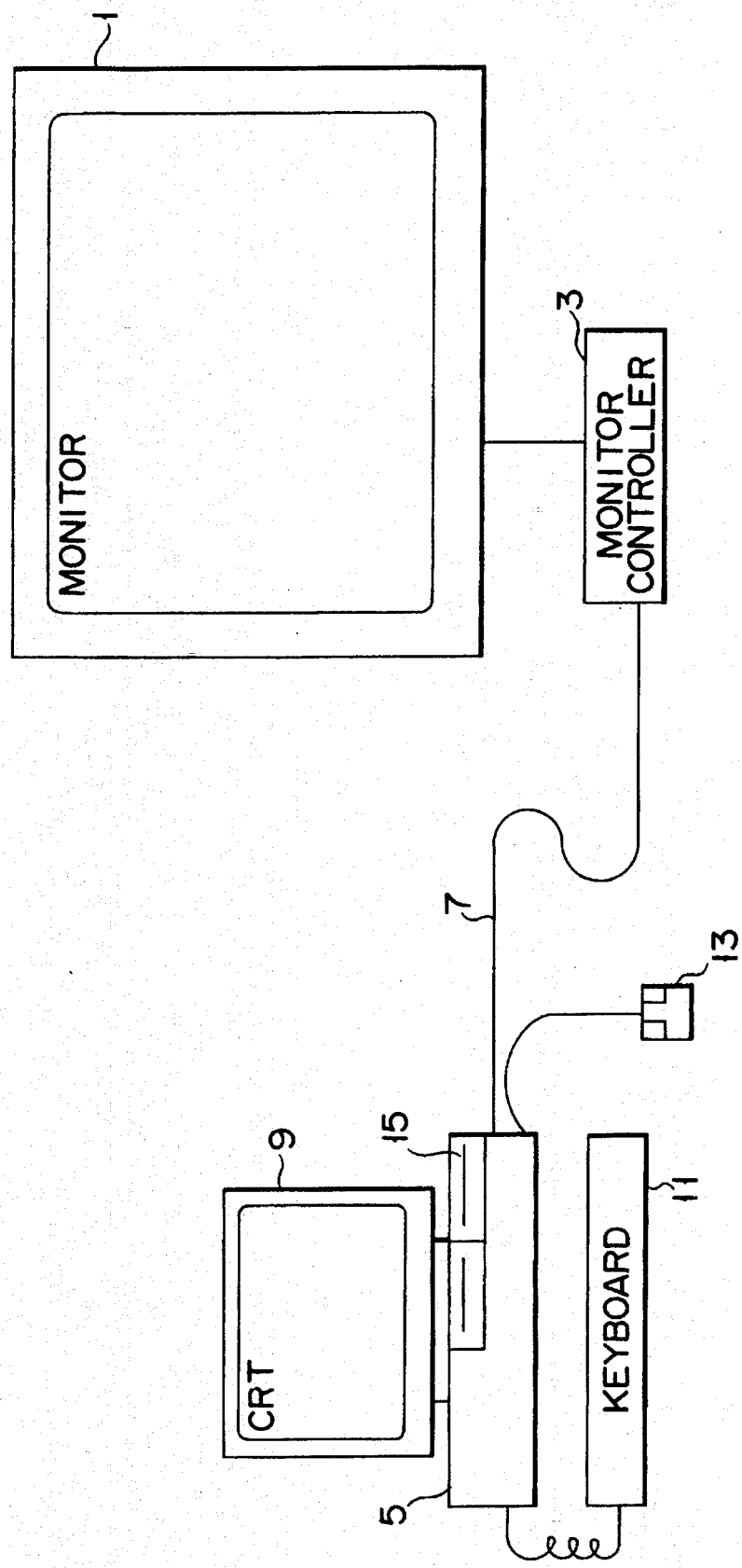
FIG. 1 is a block diagram showing a conventional meeting support system.
Figure 2:
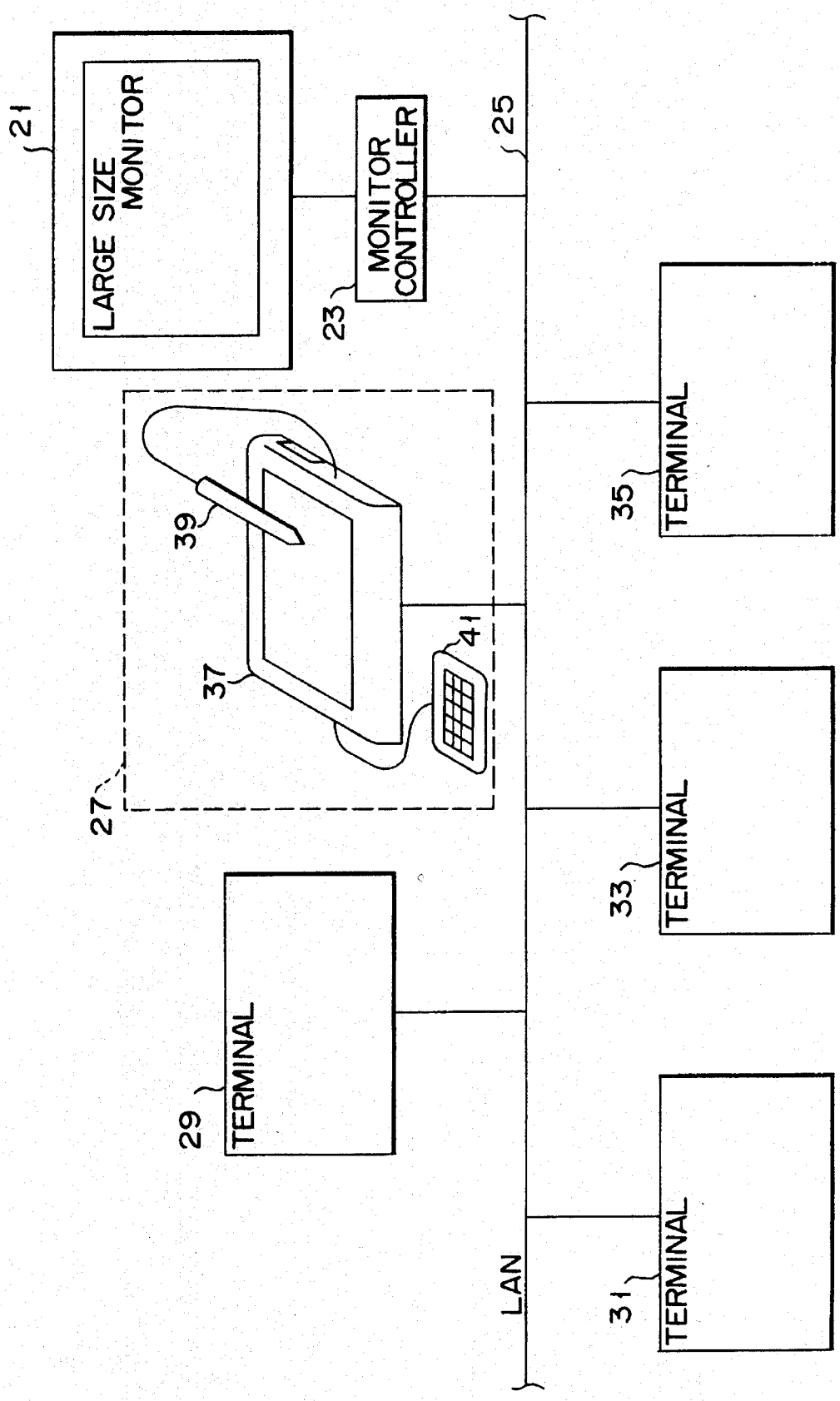
FIG. 2 is a block diagram showing a meeting support system according to an embodiment of the present invention.

FIG. 2 is a block diagram showing a meeting support system according to an embodiment of the present invention. In FIG. 2, a large size monitor 21 is shared by terminals 27, 29, 31, 33, and 35, and displays public display data. A monitor controller 23 has a function of controlling the large size monitor 21 to display various data. The controller 23 has a local area network (LAN) interface, and is connected to the terminals via a LAN cable 25. Thus, the controller 23 also has a function of controlling the terminals 27, 29, 31, 33, and 35 connected to the LAN. Each of the terminals 27, 29, 31, 33, and 35 comprises a terminal main body 37 constituted by an integrated input/display device, and a LAN interface, a pen 39 for inputting coordinates to the integrated input/display device, and a keyboard 41 serving as a character input device of the terminal.

Figure 3:
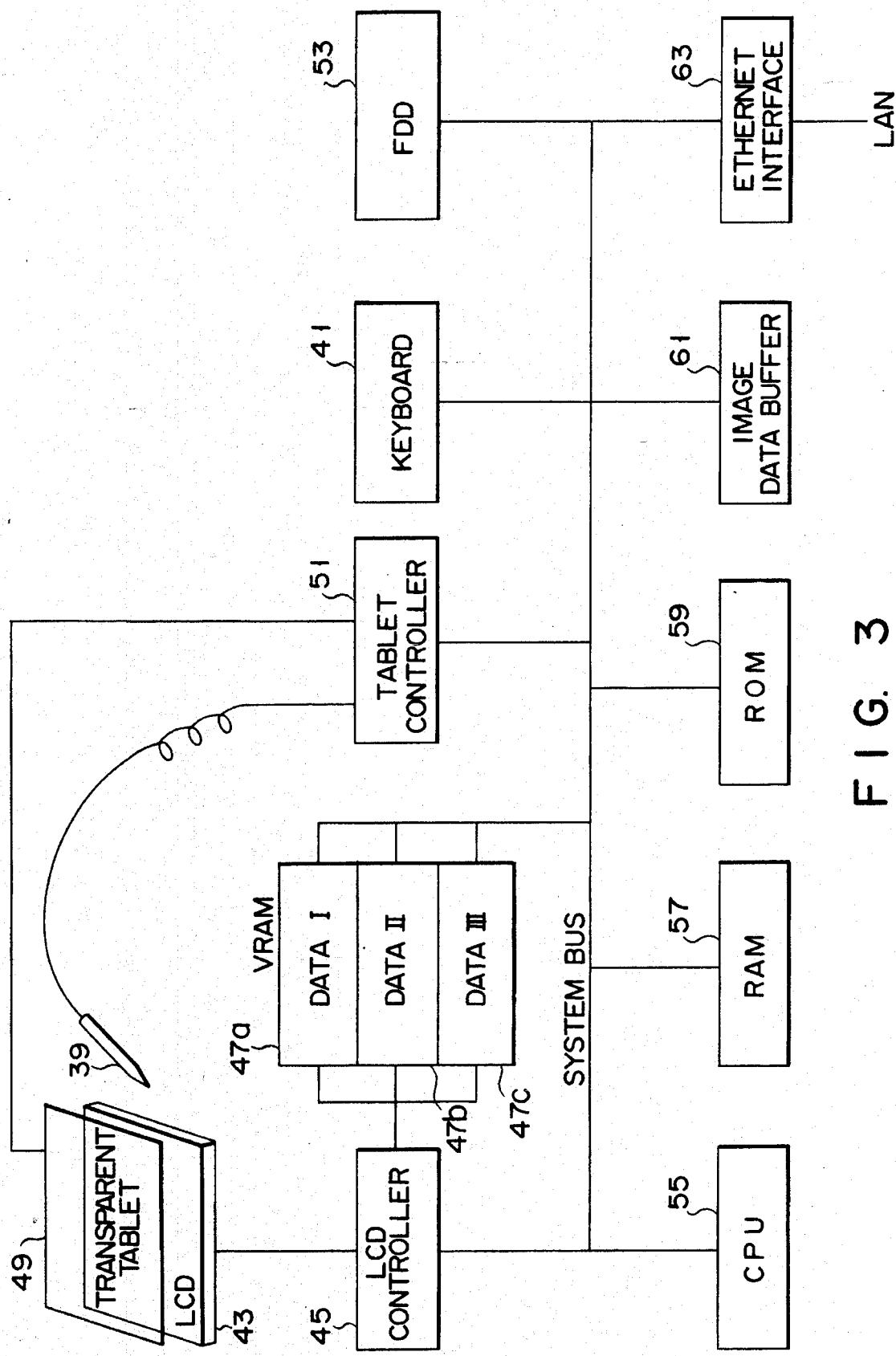
FIG. 3 is a detailed block diagram of a terminal shown in FIG. 2.

FIG. 3 is a block diagram showing an internal arrangement of each terminal.

In FIG. 3, a display device 43 comprises, e.g., a liquid crystal display (LCD). The LCD 43 is connected to an LCD controller 45. The LCD controller 45 is also connected to video RAMs (VRAMs) 47a, 47b, and 47c, and controls to display data in the VRAMs 47a, 47b, and 47c on the LCD 43. In this case, the LCD controller 45 can select arbitrary ones of data DATAI, DATAII, and DATAIII of the VRAMs 47a, 47b, and 47c, and can display ORed data of the selected data on the LCD 43. Each of the VRAMs 47a, 47b, and 47c is of a bit map memory type whose one bit corresponds to one dot of the LCD. The VRAM 47a holds image data of an individual terminal (individual or private data). The VRAM 47b holds image data (public data) displayed on the large size monitor 21. The VRAM 47c holds distribution material data prepared in advance. A transparent tablet 49 detects the position of a pen 39. The transparent tablet 49 is of, e.g., an electrostatic coupling type, and constitutes the integrated input device. A tablet controller 51 controls the transparent tablet 49 and the pen 39, so that the tablet 49 detects the position of the pen 39, and supplies position data of the pen 39 detected by the tablet 49, and ON/OFF data of switches to a CPU 55.

A user designates a position on the tablet 49 using the pen 39. The pen 39 has switches on a pen tip and a pen shaft, and supplies their ON/OFF data to the tablet controller 51. FIGS. 6A and 6B show the outer appearance of the pen tip, and the structure of the pen tip switch, respectively.

The CPU 55 controls the entire terminal in accordance with a program. A main memory (RAM) 57 stores various data, and programs, and is accessed by the CPU 55. A ROM 59 is a read-only nonvolatile memory for storing programs for controlling the CPU 55, and various data such as bit patterns corresponding to character codes. An image data buffer 61 is a RAM for temporarily storing data of the VRAMs 47a, 47b, and 47c. The image data buffer 61 has a capacity capable of storing data for a plurality of pages if a set of the three VRAMs 47a, 47b, and 47c are regarded as one page.

An Ethernet interface 63 is a LAN interface to be connected to an Ethernet line. A floppy disk drive (FDD) 53 is an auxiliary storage device on/from which various data are written/read out. Characters are input via the keyboard 41.

The LCD 43 and the LCD controller 45 may be replaced with a CRT and a CRT controller, respectively.

Figure 4:
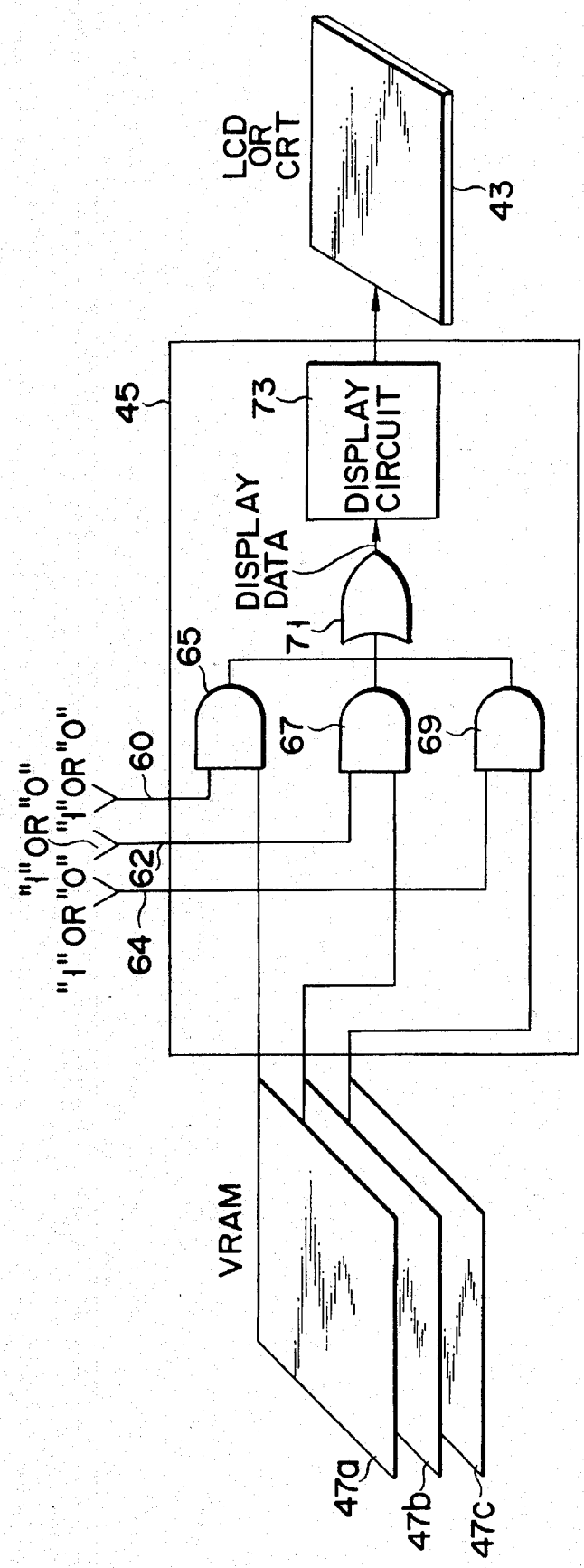
FIG. 4 is a detailed block diagram of an LCD controller shown in FIG. 3.

FIG. 4 is a detailed block diagram of the LCD controller 45 shown in FIG. 3. As shown in FIG. 4, the LCD controller 45 has AND gates 65, 67, and 69, an OR gate 71, and a display circuit 73. One input terminal of each of the AND gates 65, 67, and 69 receives display data from a corresponding one of the VRAMs 47a, 47b, and 47c, and the other input terminal thereof receives a selection signal indicating whether or not data of the VRAM is to be displayed. More specifically, when a "1"-level selection signal is supplied to the input terminal of the AND gate 65, data of the VRAM 47a is displayed on the LCD 43. Similarly, when a "1"-level selection signal is supplied to the input terminal of the AND gate 67, data of the VRAM 47b is displayed on the LCD. When a "1"-level selection signal is supplied to the input terminal of the AND gate 69, data of the VRAM 47c is displayed on the LCD 43. The outputs from the AND gates 65, 67, and 69 are supplied to the OR gate 71. The OR gate 71 ORs the data from the AND gates 65, 67, and 69, and outputs the ORed data to the LCD 43. Therefore, when "1"-level selection signals are supplied to the AND gates 65, 67, and 69, data obtained by synthesizing display data of the VRAMs 47a, 47b, and 47c is displayed on the LCD 43.

Figure 5:
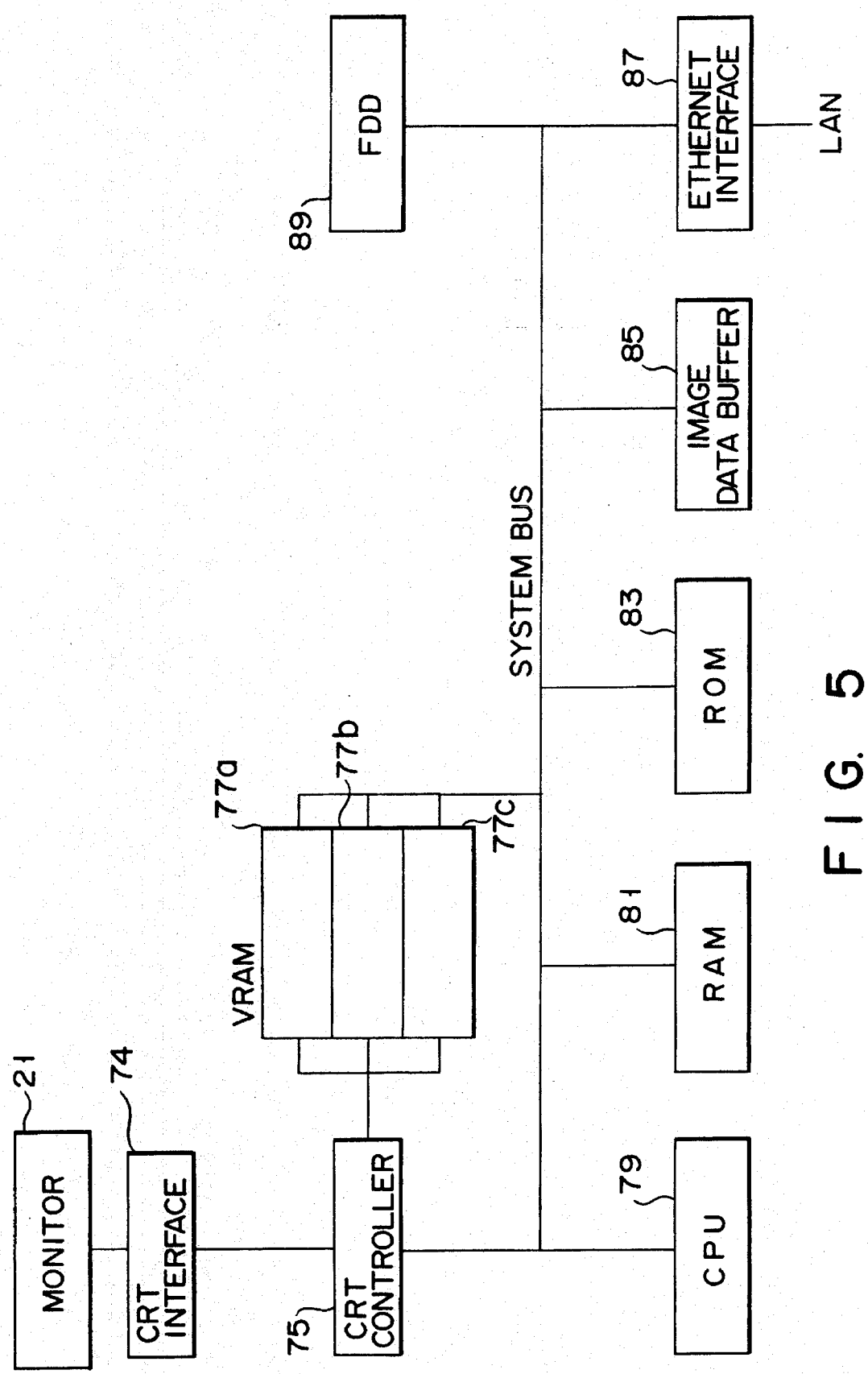
FIG. 5 is a detailed block diagram of a monitor controller shown in FIG. 2.

FIG. 5 is a block diagram showing an internal arrangement of the monitor controller 23.

A CRT controller 75 is connected to video RAMs (VRAMs) 77a, 77b, and 77c, and controls to display data of the VRAMs 77a, 77b, and 77c on the monitor 21 via a CRT interface 74. The CRT controller 75 has the same internal arrangement as that of the LCD controller shown in FIG. 4. The CRT controller 75 can select arbitrary ones of data DATAI, DATAII, and DATAIII of the VRAMs 77a, 77b, and 77c, and can display ORed data of the selected data on the monitor 21. Each of the VRAMs 77a, 77b, and 77c is of a bit map memory type whose one bit corresponds to one dot of the CRT. The VRAM 77a holds image data of an individual terminal (individual data). The VRAM 77b holds image data (public data) displayed on the large size monitor 21. The VRAM 77c holds distribution material data prepared in advance. A CPU 79 controls the entire monitor controller 23 in accordance with a program. A RAM 81 stores various data, and programs, and is accessed by the CPU 79. A ROM 83 is a read-only nonvolatile memory for storing programs for controlling the CPU 79, and various data. An image data buffer 85 is a RAM for temporarily storing data of the VRAMs 77a, 77b, and 77c. The image data buffer 85 has a capacity capable of storing data for a plurality of pages if a set of the three VRAMs 77a, 77b, and 77c are regarded as one page.

An Ethernet interface 87 is a LAN interface to be connected to an Ethernet line. A floppy disk drive (FDD) 89 is an auxiliary storage device on/from which various data are written/read out. Characters are input via the keyboard 41.

FIGS. 6A and 6B respectively show the outer appearance of the pen tip of the pen 39, and the structure of the pen tip switch. As shown in FIG. 6A, the pen 39 comprises a pen tip switch 91, and a pen shaft switch 93. FIG. 6B shows the internal structure of a pen shaft 95. As shown in FIG. 6B, a spring 99 is wound around a pen tip 97. One of electrodes 101 is formed on the end portion of the pen tip 97. The electrodes 101 are connected to signal lines 103 for supplying a switch signal.

When the pen tip 97 is depressed, the electrodes 101 are in contact with each other, and corresponding data is transmitted through the signal lines 103 (switch ON). When the pen tip 97 is released, the electrodes 101 are separated from each other by the spring 99 (switch OFF). The CPU 55 (FIG. 3) of the terminal determines data input when the pen tip switch 91 is ON as trace data, determines data input when the pen shaft switch 93 is ON as eraser data, and determines data input when neither of the pen tip switch 91 and the pen shaft switch 93 are ON as cursor data.

Figure 7:
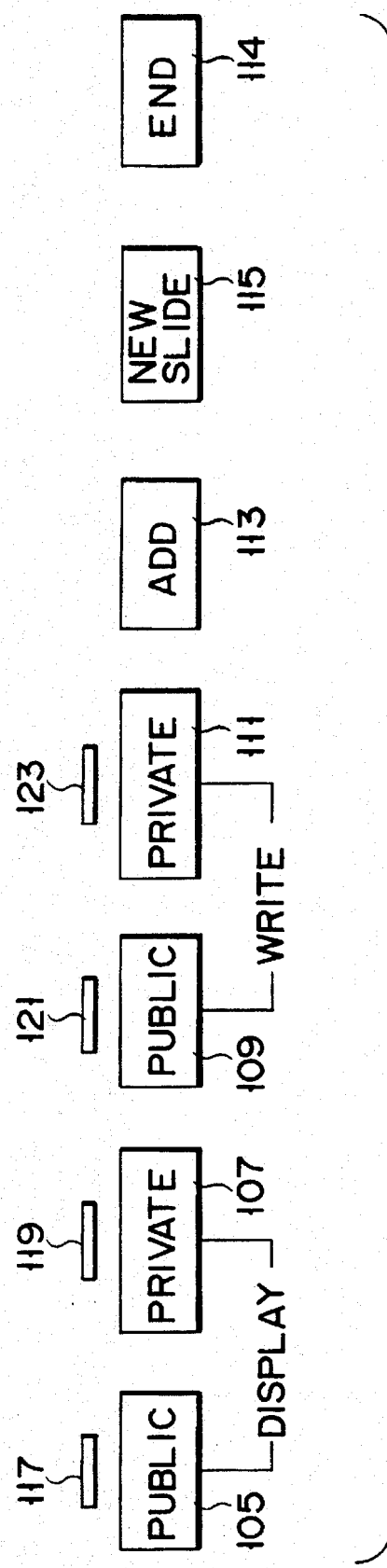
FIG. 7 is a view showing special keys arranged on a keyboard shown in FIG. 3.
Figure 8A:
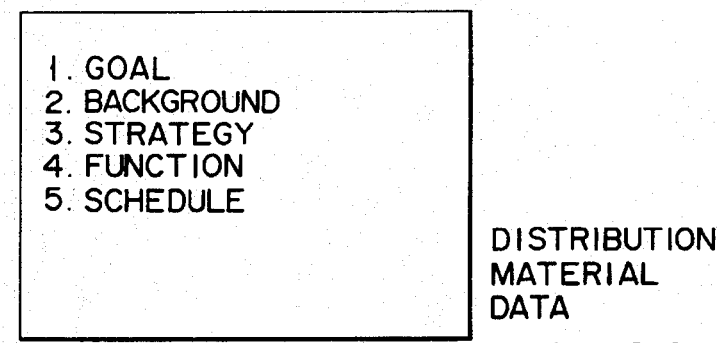
FIG. 8A shows distribution material data.
Figure 8B:
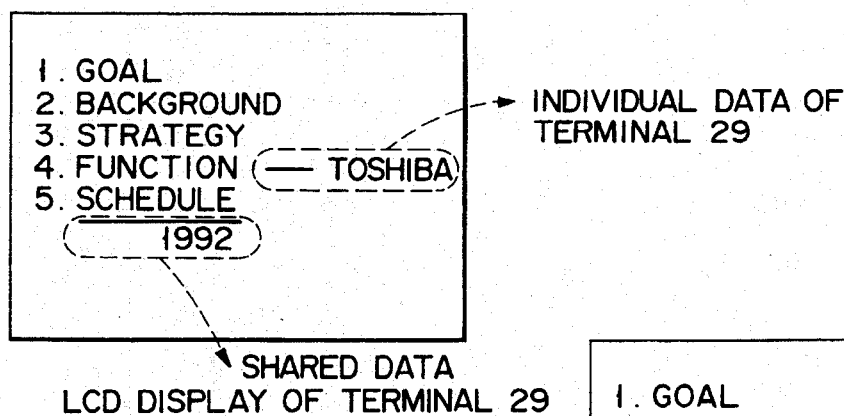
FIG. 8B shows an LCD display of a terminal 29.
Figure 8D:
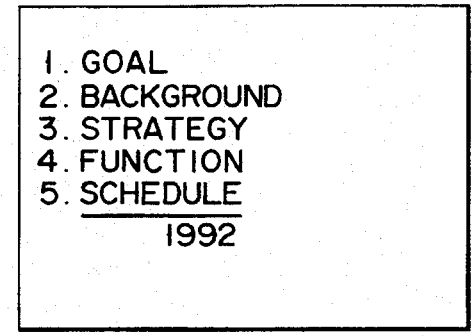
FIG. 8D shows a display screen of a large size monitor 21.
Figure 8C:
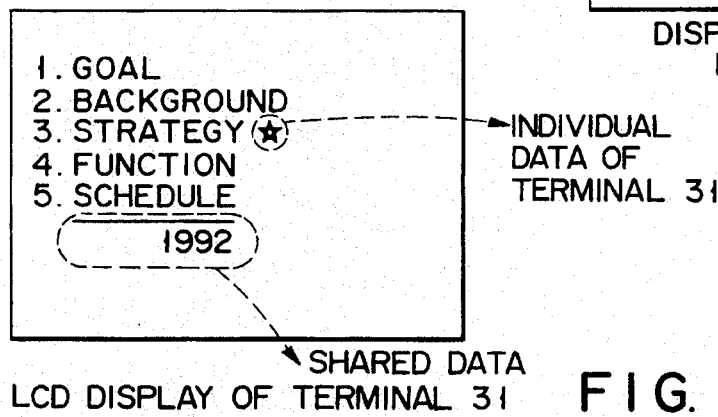
FIG. 8C shows an LCD display of a terminal 31.
Figure 9A:
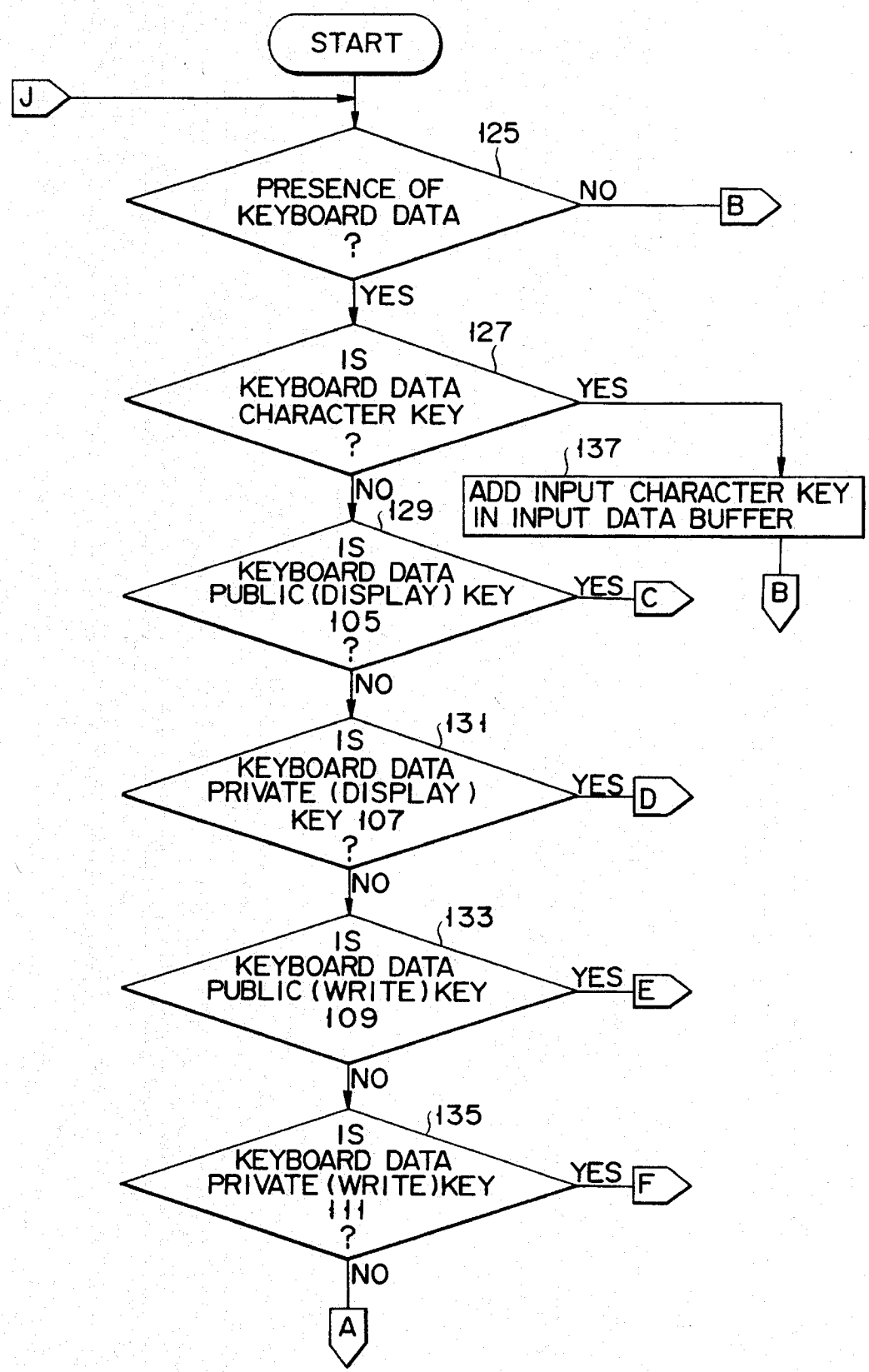
FIGS. 9A through 9I are flow charts showing operations of a terminal.
Figure 9B:
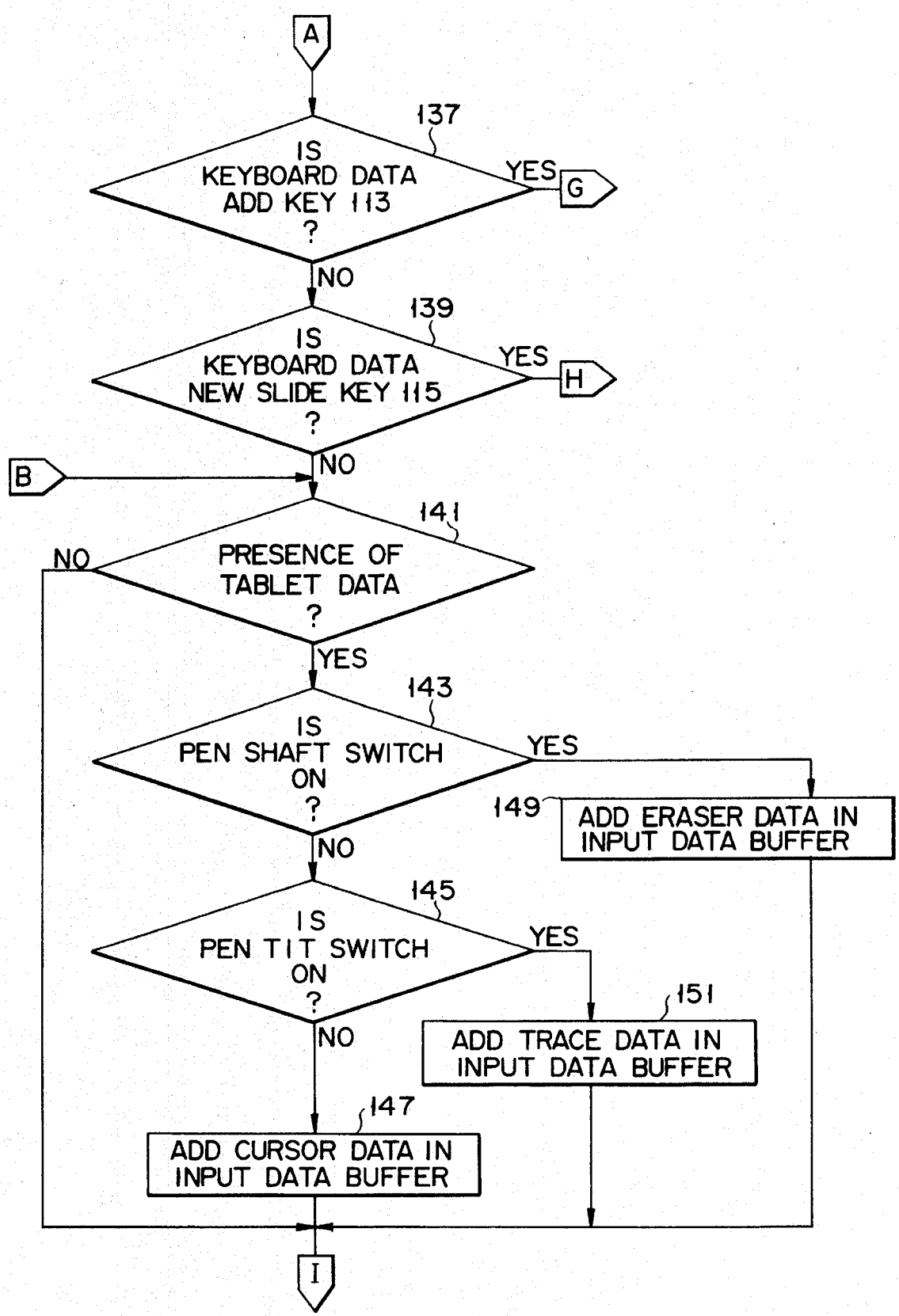
Figure 9C:
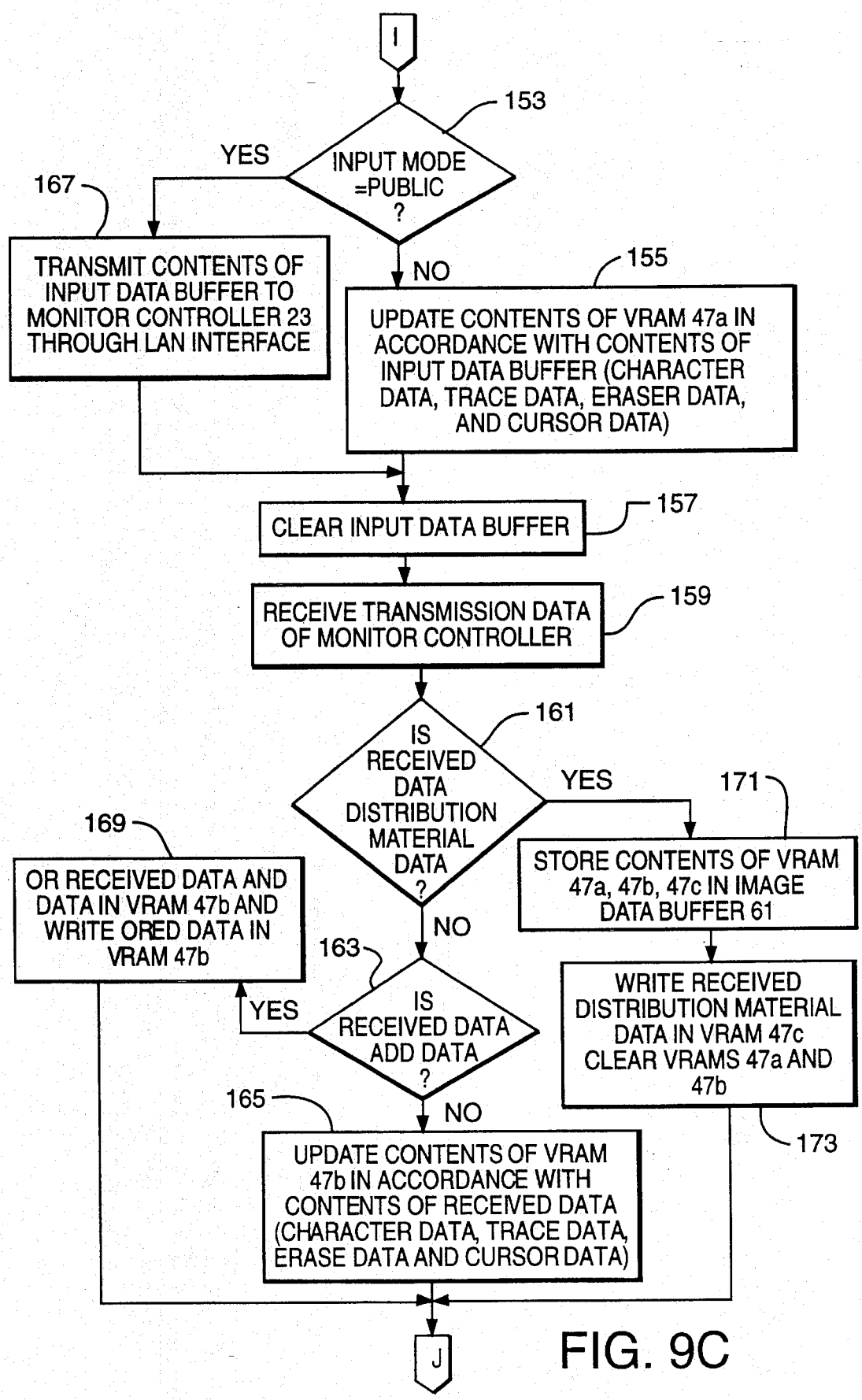
Figure 9D:
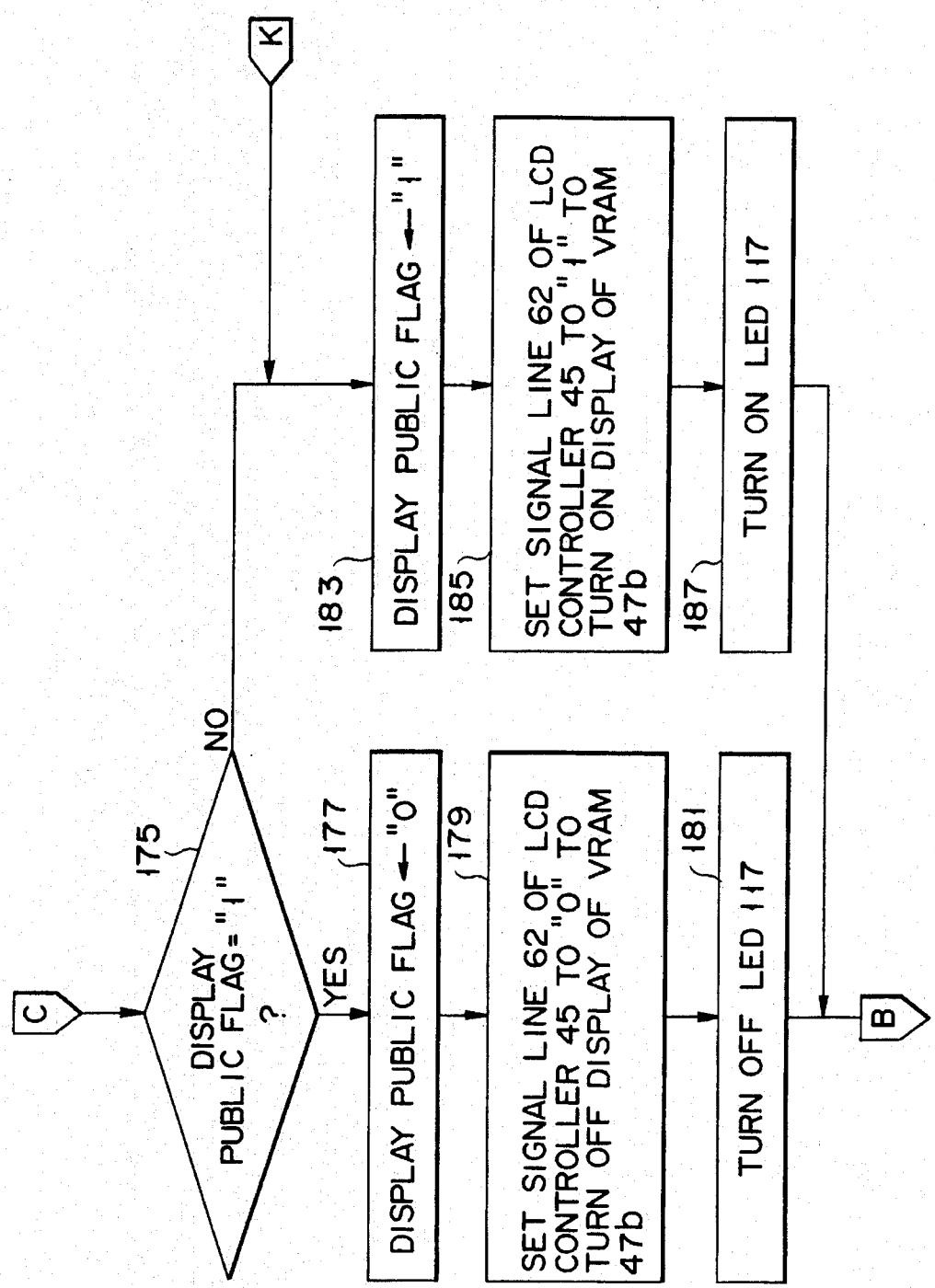
Figure 9E:
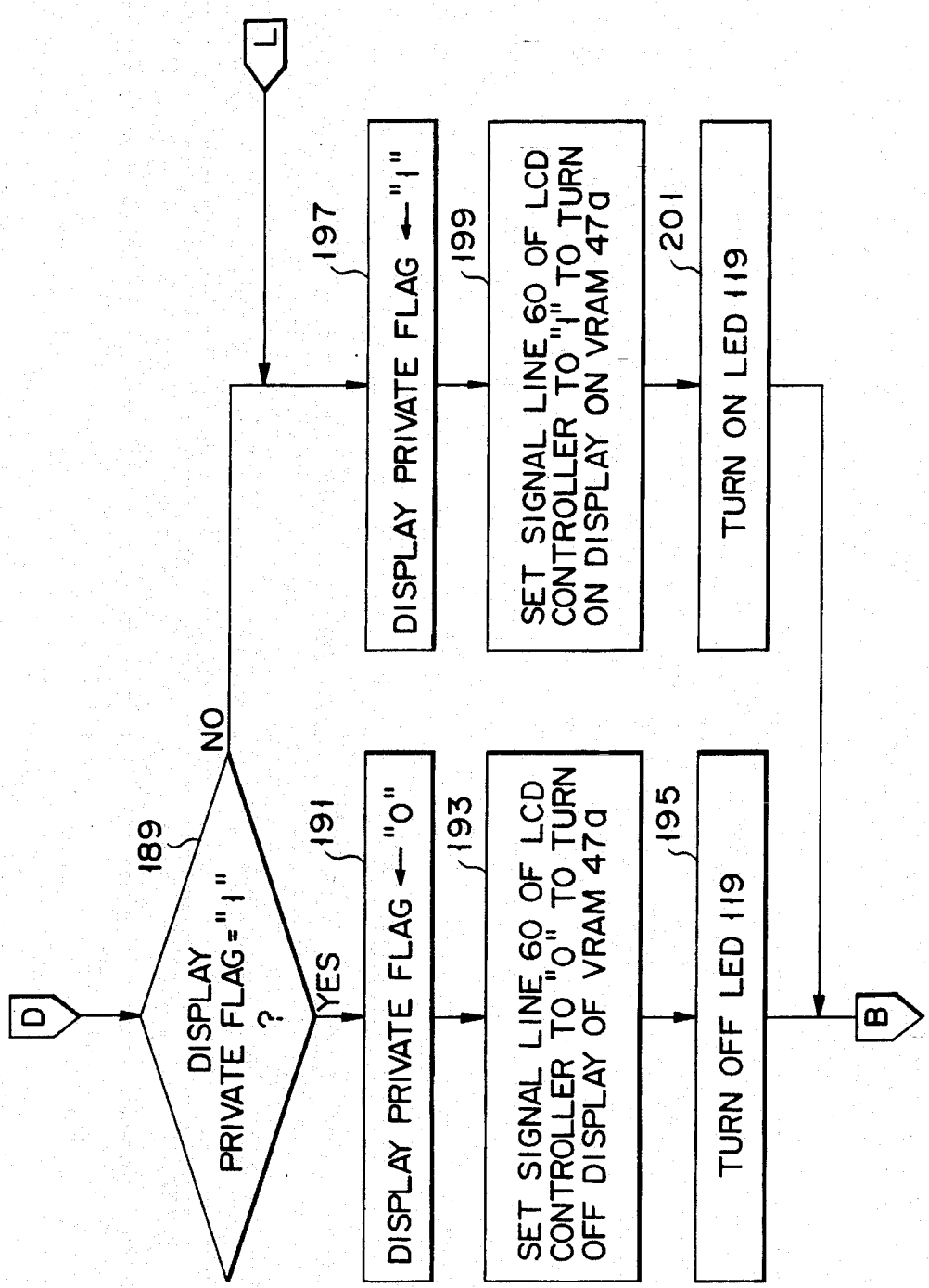
Figure 9F:
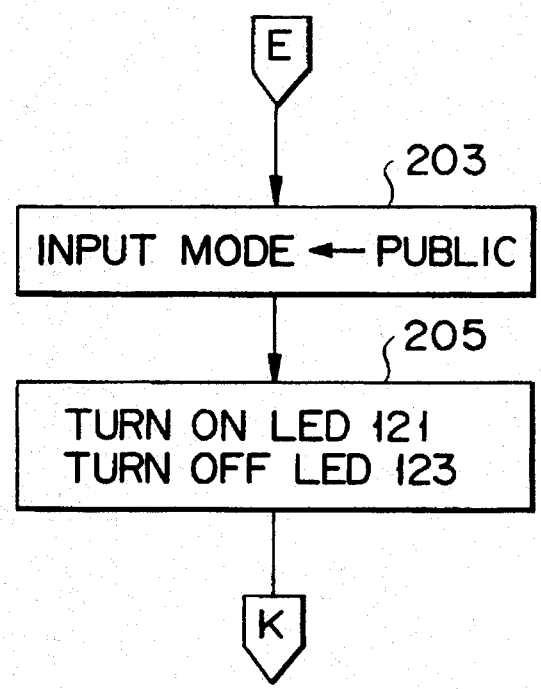
Figure 9G:
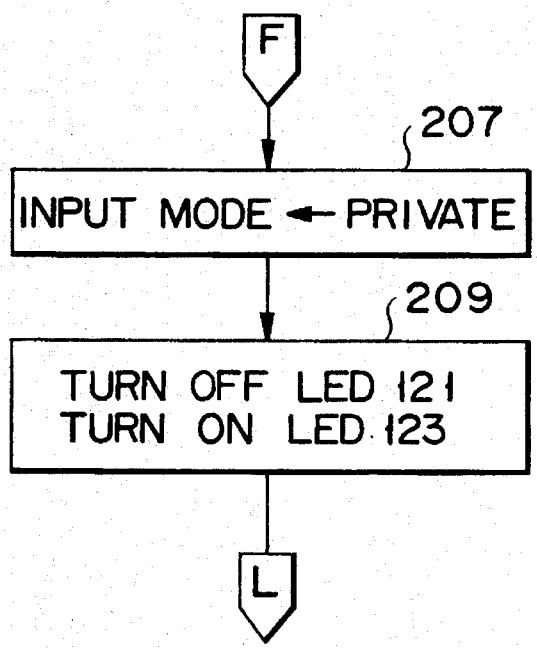
Figure 9H:
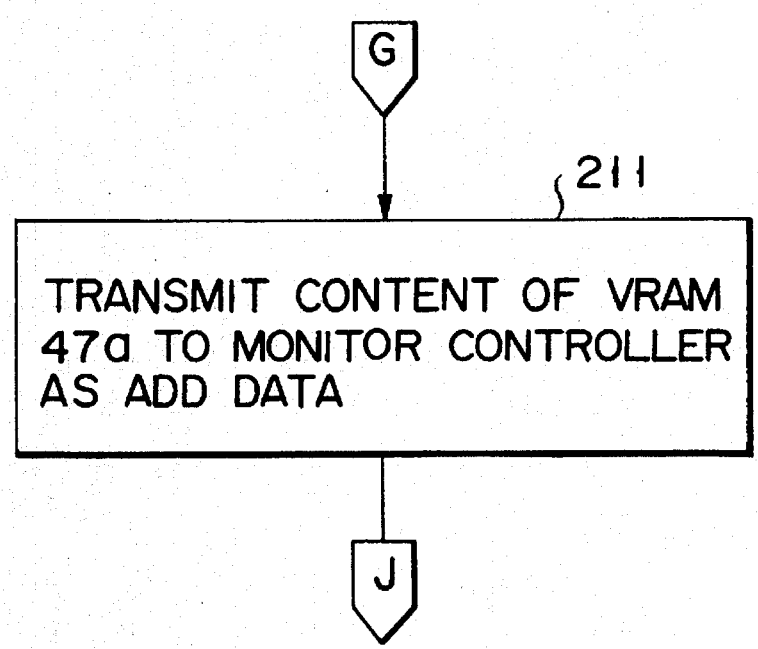
Figure 9I:
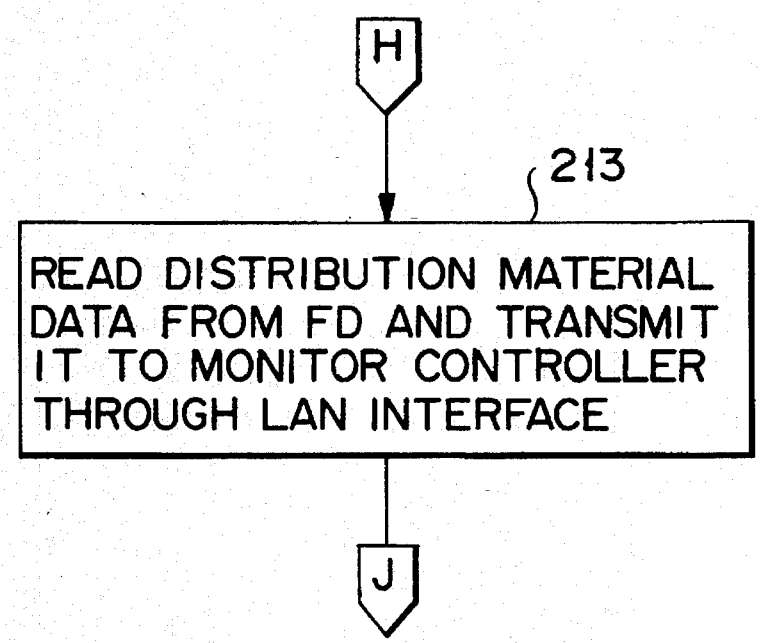
Figure 10:
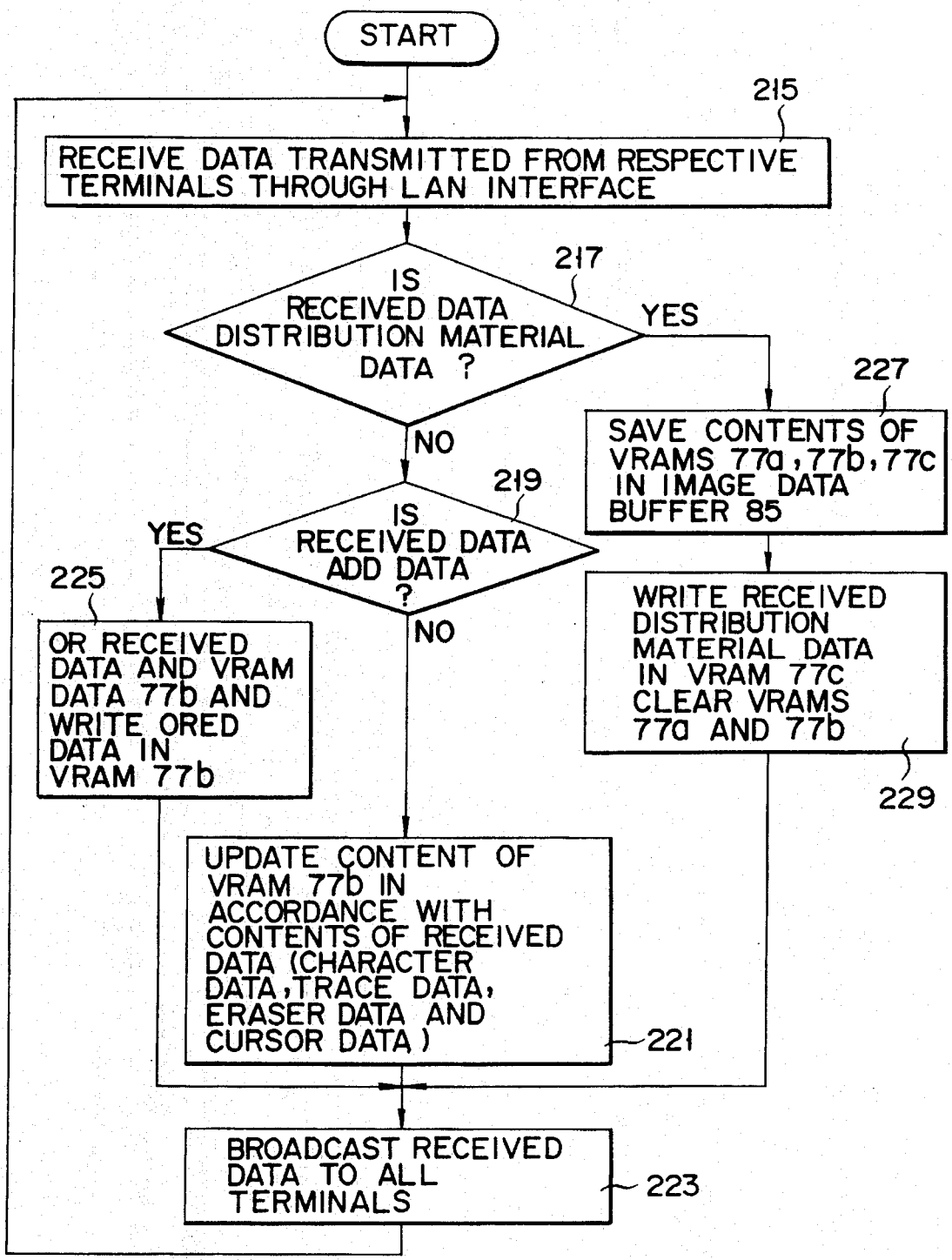
FIG. 10 is a flow chart showing an operation of the monitor controller.

FIG. 7 shows in detail the keyboard 41 shown in FIGS. 2 and 3. Special keys 105, 107, 109, 111, 113, 115, and 114 are arranged on the keyboard 41 of each of the terminals 27, 29, 31, 33, and 35 in addition to normal character input keys. The "PUBLIC" key 105 is used to select whether or not public data stored in the VRAM 47b is displayed on the LCD 43. The "PRIVATE" key 107 is used to select whether or not individual data stored in the VRAM 47a is displayed on the LCD 43. The "PUBLIC" key 109 and the "PRIVATE" key 111 are used to select the public data VRAM 47b or the individual data VRAM 47a to which data is input. The "ADD" key 113 is used to copy individual data on the public data. The "NEW SLIDE" key 115 is used to end the presently displayed page and to start a new page (the three VRAMs 47a, 47b, and 47c). The END key 114 is used to inform the end of a meeting to the CPU 55. Upon depression of the END key 114, the CPU 55 writes the contents of the VRAMs 47 in the image data buffer 61, and writes the content of the image data buffer 61 in an FD via the FDD 53. An LED 117 indicates a selection state of the key 105 (the LED 117 is turned on when the key 107 is depressed). An LED 119 indicates a selection state of the key 107. LEDs 121 and 123 respectively indicate selection states of the keys 109 and 111.

The flow of a meeting using the meeting support system of the present invention with the above arrangement is as follows.

(1) Distribution of Material Data

When a participant of the meeting has material data for the meeting, which is created in advance by another personal computer and is stored in an FD as image data, he or she distributes the data to the terminals of other participants (transfers it via the LAN). The distributed data is displayed on the LCDs 43 of the respective terminals, and the public large size monitor 21.

(2) Proceeding of Meeting

Each participant operates the pen 39 or the keyboard 41 of his or her terminal, and inputs his opinions, comments, memorandums, and the like to his terminal on which the distribution material data is displayed. In this case, a user can designate whether the input data is processed as public data (i.e., display data on the large size monitor) or individual data (data displayed on only his terminal). The data designated as the public data is displayed on the LCD 43 of his terminal, and is also displayed on the large size monitor 21 and the LCDs 43 of other terminals (FIG. 8). In this case, participants can designate whether one or both of individual data and public data are to be displayed (distribution material data is always displayed). When a display screen is switched to a new page, data in the VRAMs 47 of each terminal, and data in the VRAMs 77 of the monitor controller 23 are respectively saved in the image data buffer 61 of the corresponding terminal and the image data buffer 85 of the monitor controller 23.

(3) End of Meeting

When the meeting ends, each participants saves the material data and the memorandum data stored in the image data buffer 61 on the FDD 53, and brings it back with him as the material data of the meeting.

The operation of the embodiment of the present invention will be described below along the flow of the meeting with reference to FIGS. 9A through 9I, and FIG. 10.

(1) Distribution of Material Data (Start of Meeting)

(i) A participant of the meeting, who uses the terminal 27 (FIG. 2) operates the terminal to load the material data of the meeting (image data) prepared in a floppy disk from the FDD 53 (FIG. 3) to the main memory (RAM) 57 (FIG. 3).

(ii) The terminal 27 transmits the image data loaded to the main memory 57 to the monitor controller 23 (FIG. 2) via the LAN interface 63 (FIG. 3) and the LAN cable 25 (FIG. 2).

(iii) The monitor controller 23 receives the image data transmitted in step (ii) via the LAN interface 87 (FIG. 5), stores it in the main memory (RAM) 81 (FIG. 5), and writes the image data in the VRAM 77c (FIG. 5).

(iv) The monitor controller 23 transmits the image data stored in the main memory 81 in step (iii) to all the terminals 27, 29, 31, 33, and 35 via the LAN interface 87 and the LAN cable 25 (FIG. 2). In this transmission, a broadcast transmission function of the Ethernet is used.

(v) Each of the terminals 27, 29, 31, 33, and 35 receives the image data transmitted in step (iv) via the LAN interface 63 (FIG. 3), and writes it in the VRAM 47c.

(vi) Each of the terminals 27, 29, 31, 33, and 35, and the monitor controller 23 sets a signal line 64 of the LCD or CRT controller 45 at "1" level. As a result, the image data transferred to the terminals and the monitor controller is displayed on the LCDs 43 of the terminals, and the large size monitor 21.

In the above description, the meeting material data is loaded from the terminal 27, and is distributed to other terminals. The same applies to the case wherein meeting material data are loaded from another terminal 29, 31, 33, or 35, and is distributed to other terminals. If no meeting material data to be distributed is prepared in advance, step (i) described above is unnecessary. In this case, distribution material data in VRAMs 77c and 47c are all "0"s.

(2) Operations During Meeting

In the flow charts shown in FIGS. 9A through 9I, a DISPLAY PUBLIC flag is allocated in the main memory 57 (FIG. 3). This flag is set to be "1" when individual data in the VRAM 47a is displayed on the LCD 43; otherwise, it becomes "0". A DISPLAY PRIVATE flag is allocated in the main memory 57 (FIG. 3). This flag is set to be "1" when individual data in the VRAM 47a is displayed on the LCD 43; otherwise, it becomes "0". An input mode flag is allocated in the main memory 57 (FIG. 3). This flag is set to be "1" (=PUBLIC) when input data from the tablet or the keyboard is public data, and it becomes "0" (=PRIVATE) when input data is individual data. An input data buffer is allocated in the main memory 57 (FIG. 3), and stores input data from the tablet or the keyboard.

[1] Switch Display Screen

<1> When the PUBLIC (DISPLAY) key 105 on the keyboard is depressed (step 129), if public data has already been displayed (step 175), the content of the public data VRAM 47b is inhibited from being displayed on the LCD 43 (step 179), and the corresponding LED 117 is turned off (step 181).

If no public data is displayed, the content of the public data VRAM 47b is displayed on the LCD 43 (step 185), and the corresponding LED 117 is turned on (step 187).

<2> When the PRIVATE (DISPLAY) key 107 on the keyboard 41 is depressed (step 131), like in step <1>, if individual data has already been displayed (step 189), the content of the individual data VRAM 47a is inhibited from being displayed on the LCD 43 (step 193), and the corresponding LED 119 is turned off (step 195).

If no individual data is displayed, the content of the individual data VRAM 47a is displayed on the LCD 43 (step 199), and the corresponding LED is turned on (step 201).

[2] Switch Input Mode

<1> When the PUBLIC (WRITE) key 109 on the keyboard 41 is depressed (133), a public data input mode is selected (step 203), and the LED 121 is turned on (step 205). In addition, public data is displayed on the LCD 43 (steps 183 through 187).

<2> When the PRIVATE (WRITE) key 111 on the keyboard is depressed (step 135), an individual data input mode is selected (step 207 in FIG. 9G), and the LED 123 is turned on. In addition, individual data is displayed on the LCD 43 (steps 197 through 201).

[3] Input and Display Data to be Displayed

When a character is input from the keyboard 41 (step 127 in FIG. 9A), or when coordinate data is input from the tablet 49 (step 141 in FIG. 9B), the character code data or coordinate data is stored in the input data buffer of the main memory 57 (steps 137, 147, 149, and 151). The coordinate data from the tablet is classified to trace data (the pen tip switch is ON), eraser data (the pen shaft switch is ON), and cursor data (both the pen tip switch and the pen shaft switch are OFF) in accordance with the states of the pen tip switch 91 and the pen shaft switch 93 at that time (steps 143 and 145).

<1> When Public Data is Input

When the input mode flag=1 (PUBLIC=1) (step 153), input data stored in the input data buffer of the RAM 57 is transmitted to the monitor controller 23 via the LAN interface 63 (step 167). In this transmission processing, for example, a timer interrupt signal is generated several times in one second using a known timer (not shown). In response to the timer interrupt signal, the CPU 55 executes an interrupt processing routine, thereby transmitting input data in the input data buffer to the monitor controller 23 in real time. After transmission, the image data buffer 61 is cleared (step 157).

The monitor controller 23 receives data transmitted from the terminal in step 167 (step 215 in FIG. 10), and updates the content of the public data display VRAM 77b in accordance with the content of the received data (step 221). In this case, if display data is character code data, the controller 23 reads out a bit pattern of a character corresponding to the character code from the ROM 83, and writes it at the cursor position. When display data is coordinate data and trace data, a bit on the VRAM 77b corresponding to a dot on the LCD or CRT corresponding to the input coordinate data is set to be "1".

When display data is coordinate data and eraser data, bits on the VRAM corresponding to the interior of a square region on the LCD or CRT having the coordinates as the central coordinates, and a predetermined size are set to be all "0"s. When display data is coordinate data and cursor data, a cursor displayed so far is erased, and is displayed at the coordinate position of new display data. The cursor is displayed and erased by logically exclusive-ORing (XOR-ing) cursor pattern data ("♦" mark) on the VRAM. In the monitor controller 23, a signal line (corresponding to the signal line 62 in FIG. 4) of the CRT controller 75 is always set to be "1", and the content (public data) of the VRAM 77b is always displayed.

The monitor controller 23 broadcasts the received display data to all the terminals via the LAN interface 87 (step 223).

Each terminal receives the display data transmitted in step 223 (step 159), and updates the content of the public data display VRAM 47b on the basis of the received data. When display data is character code data, the CPU 55 reads out a bit pattern of a character corresponding to the character code from the ROM 59, and writes it at the cursor position. When display data is coordinate data and trace data, the CPU 55 sets a bit on the VRAM 47b corresponding to a dot on the LCD or CRT corresponding to the coordinate data to be "1".

<2> Individual Data

When the input mode flag=0 (PRIVATE) (step 153), the content of the individual data display VRAM 47a is updated on the basis of the content of input data stored in the input data buffer of the RAM 57 (step 155). In this case, when display data is character code data, the CPU 55 reads out a bit pattern of a character corresponding to the character code from the ROM 59, and writes it at the cursor position. When display data is coordinate data and trace data, the CPU 55 sets a bit on the VRAM 47b corresponding to a dot on the LCD or CRT corresponding to the coordinate data to be "1". After the content is updated, the input data buffer of the RAM 57 is cleared (step 157).

[4] Add Individual Display Data to Public Display Data

When the ADD key 113 on the keyboard is depressed on the terminal (step 137), the content of the individual data display VRAM 47a is transmitted as ADD data to the monitor controller 23 via the LAN interface 63 (step 211).

The monitor controller 23 receives the data transmitted in step 211 (step 215), and writes ORed data of the received data and data in the public data display VRAM 77b in the public data display VRAM 77b.

The monitor controller 23 broadcasts the received ADD data to all the terminals (step 223).

Each terminal receives data transmitted in step 223 (step 159), and writes ORed data of the received data, and data in the public data display VRAM 47b in the public data display VRAM 47b.

[5] Start New Page

When the NEW SLIDE key 115 is depressed on the terminal (step 139), the terminal reads out distribution material data for the new page from the FDD 53, and transmits it as distribution material data to the monitor controller 23 via the LAN interface 63 (step 213).

The monitor controller 23 receives the data transmitted in step 213 (step 215), and saves the contents of the individual data display VRAM 77a, the public data display VRAM 77b, and the distribution material data VRAM 77c in the image data buffer 85. When the image data buffer 85 becomes full, the controller 23 writes the content of the buffer 85 in the FDD 89 (step 227).

The monitor controller 23 writes the distribution material data received in step 215 in the distribution material display VRAM 77c, and clears the contents of the public data display VRAM 77b and the individual data display VRAM 77a to "0" (step 229).

The monitor controller 23 broadcasts the received distribution material data to all the terminals (step 223).

Each terminal receives the data transmitted in step 223 (step 159). The contents of the individual data display VRAM 47a, the public data display VRAM 47b, and the distribution material data VRAM 47c are stored in the image data buffer 61 (step 171). In this case, the image data buffer 61 may have a large size (capacity). For example, image data may be compressed by a known method, and compressed data is stored in the buffer 61, or when the image data buffer 61 becomes full, its content may be down-loaded to a floppy disk.

In each terminal, the CPU 55 writes the distribution material data received in step 159 in the distribution material display VRAM 47c, and clears the individual data display VRAM 47a and the public data display VRAM 47b to "0".

(3) End of Meeting

When the meeting is ended, each participant depresses the END key 114 shown in FIG. 7. Upon depression of the END key 114, the CPU 55 writes the contents of the VRAMs 47 in the image data buffer 61, and writes the content (image data) of the image data buffer 61 in an FD via the FDD 53. Each participant can have this FD as the meeting material data or meeting memorandum.

As described above, the meeting support system of the present invention can be applied to an electronic meeting support system or a presentation support system.

In the above embodiment, all the terminals have been exemplified as those each having an integrated input/display device (tablet+LCD). However, some or all of the terminals may be replaced with terminals each including a monitor, a keyboard, and a mouse (or a tablet). Since all the data can be seen on each terminal, the large size monitor 21 connected to the monitor controller 23 is not always required as a system pattern. Note that the large size monitor 21 can serve as an OHP or a black board in a conventional meeting.

Figure 11C:
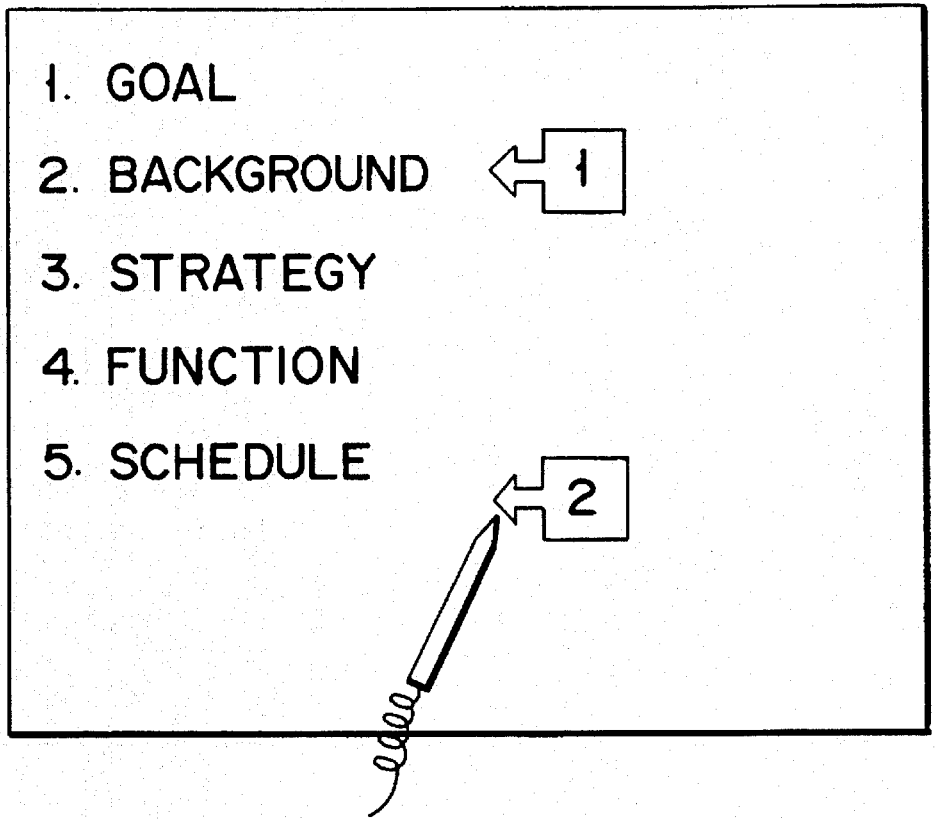
Figure 12A:
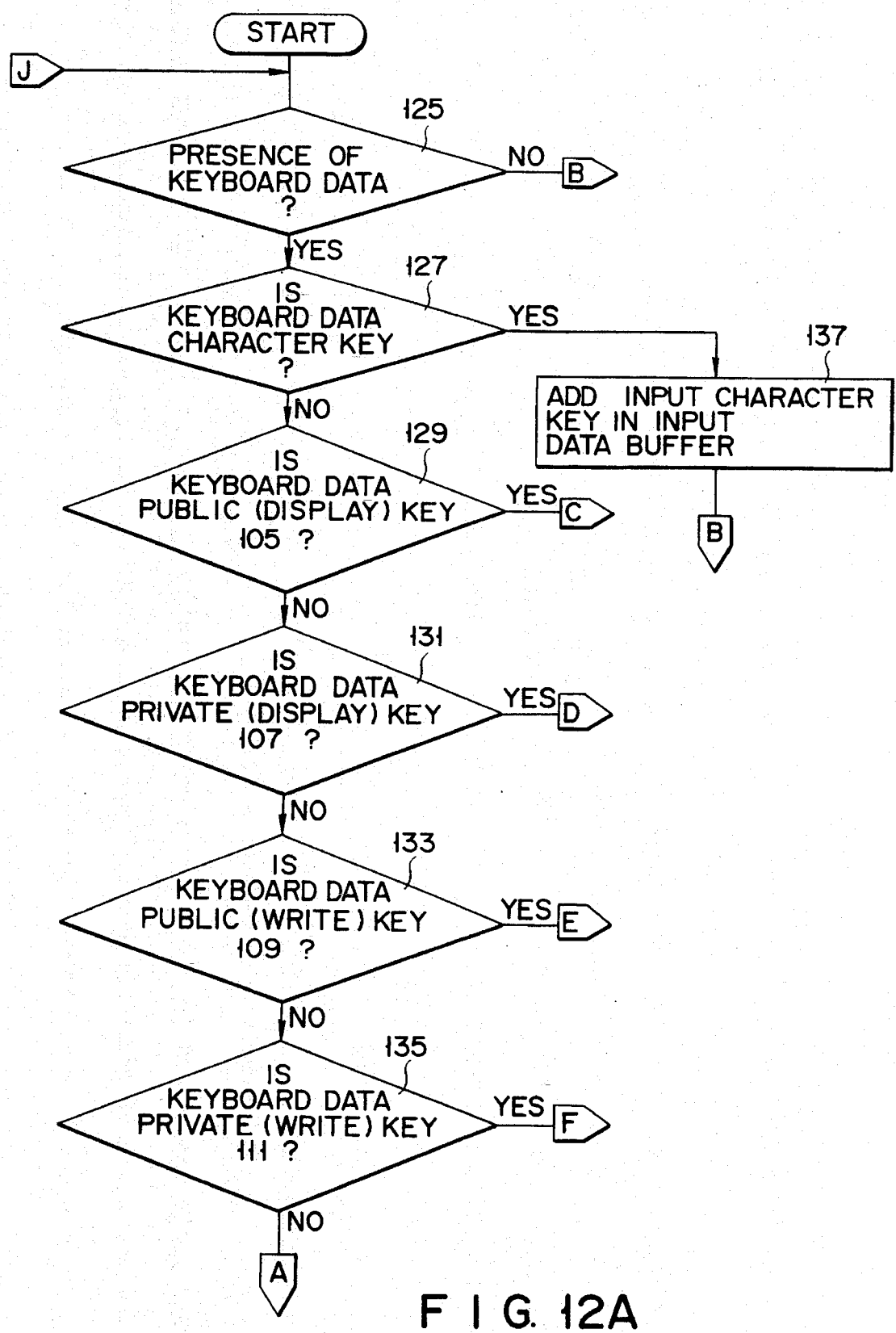
Figure 12B:
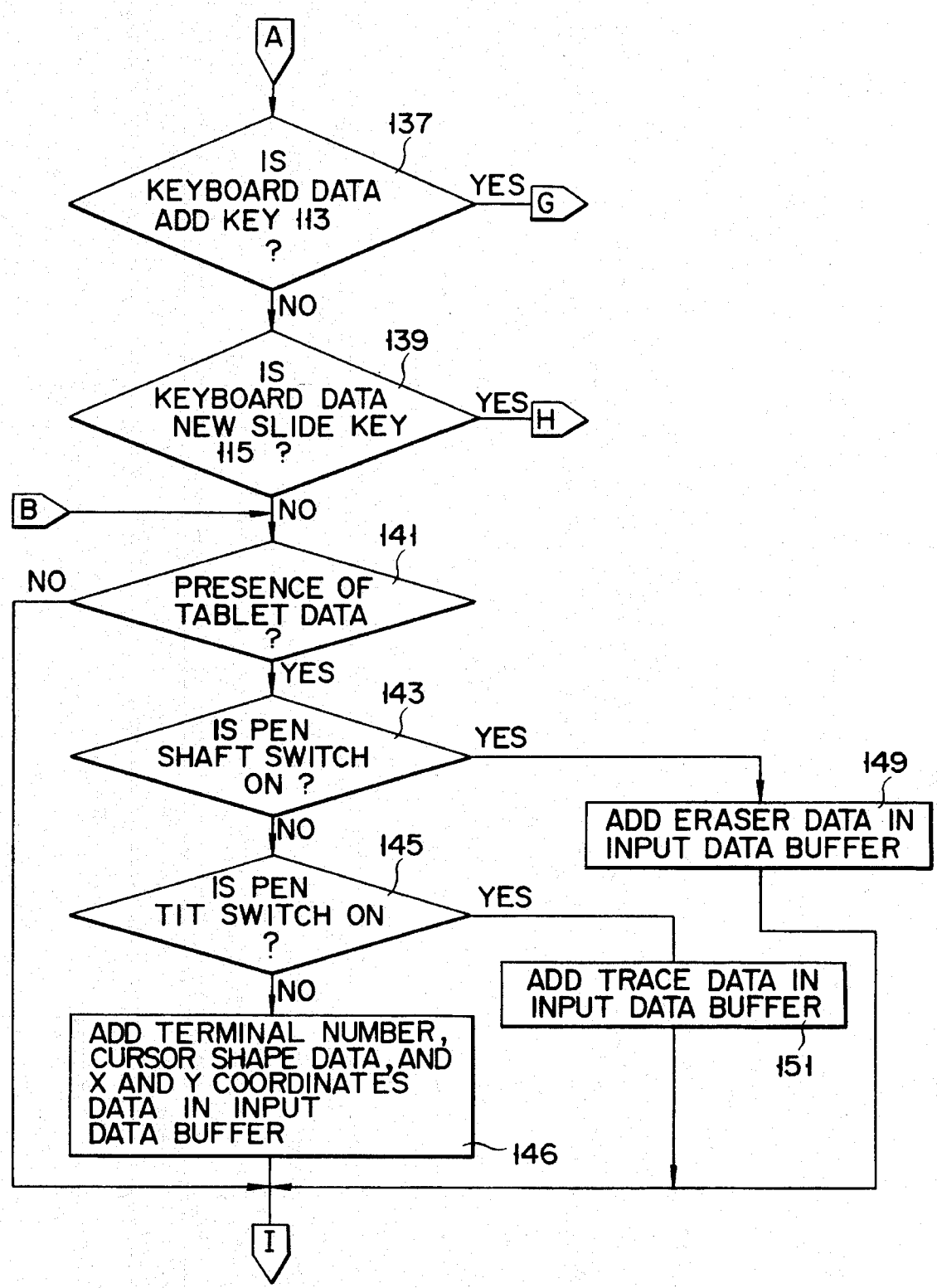
Figure 12C:
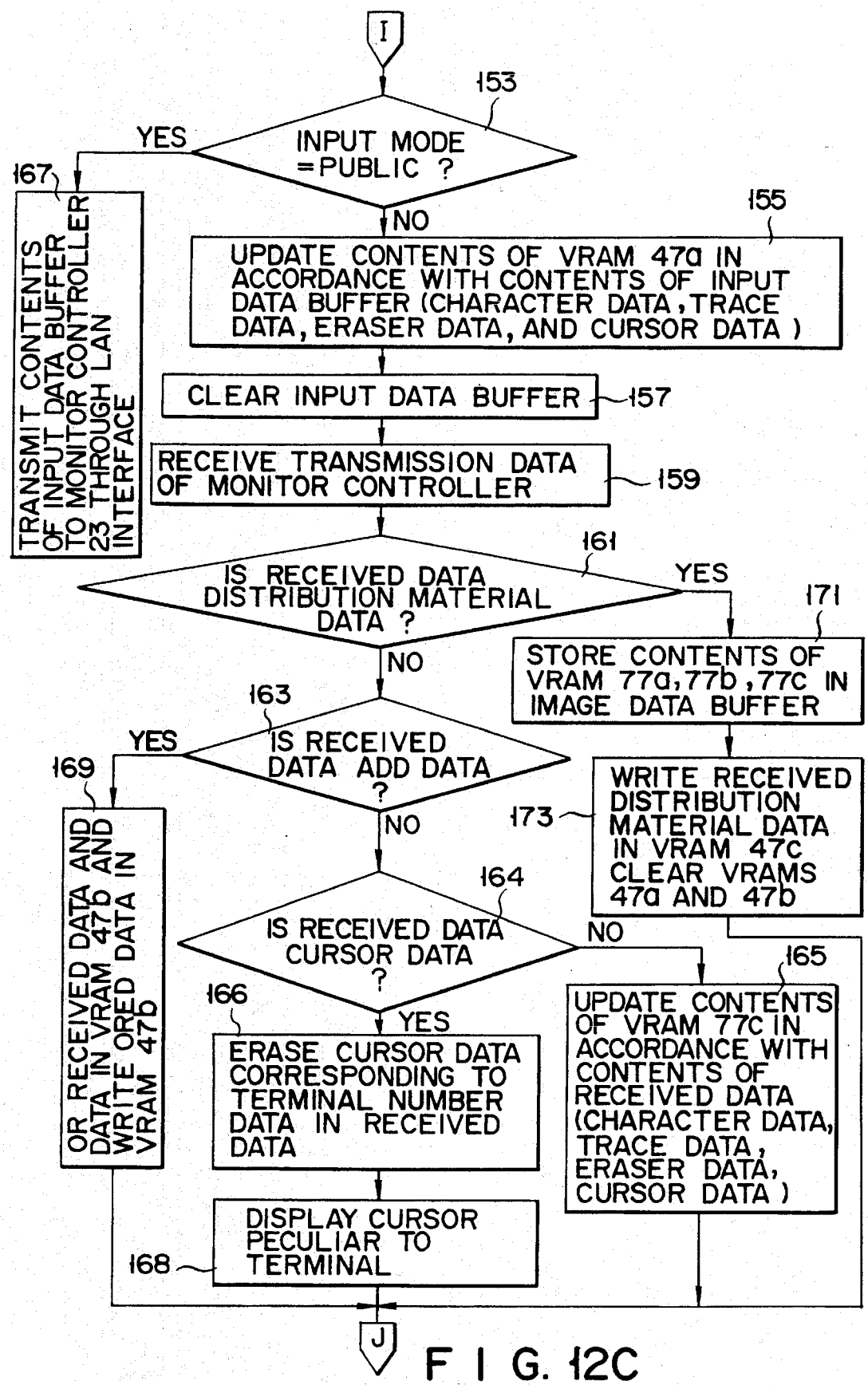
Figure 12E:
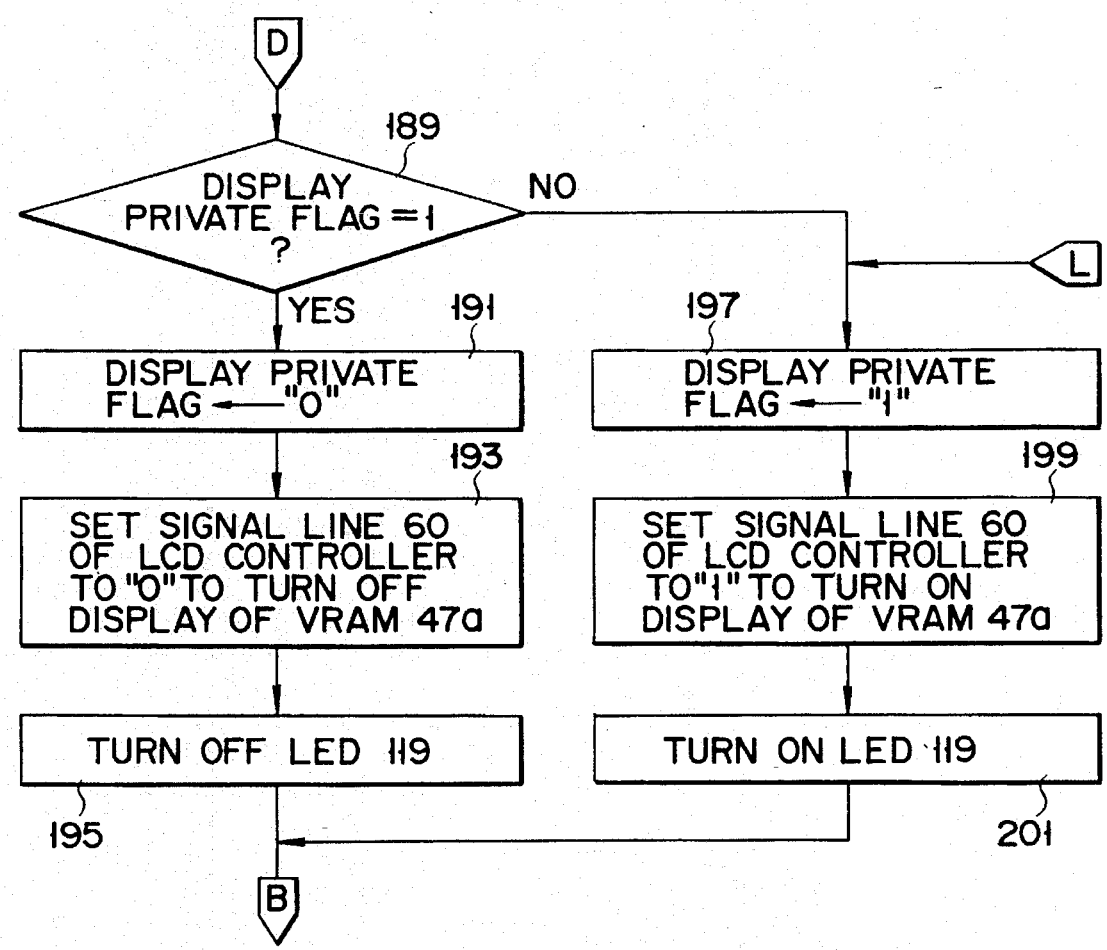
Figure 12F:
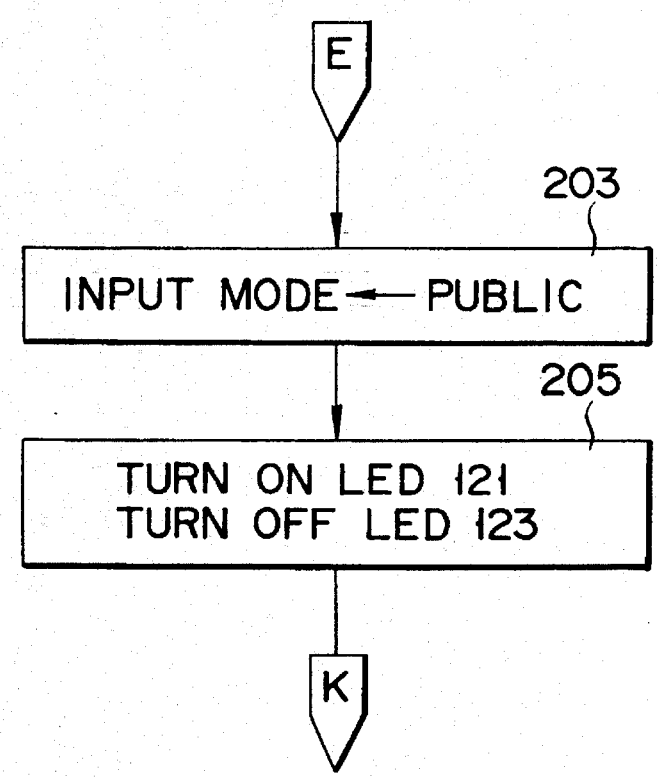
Figure 12G:
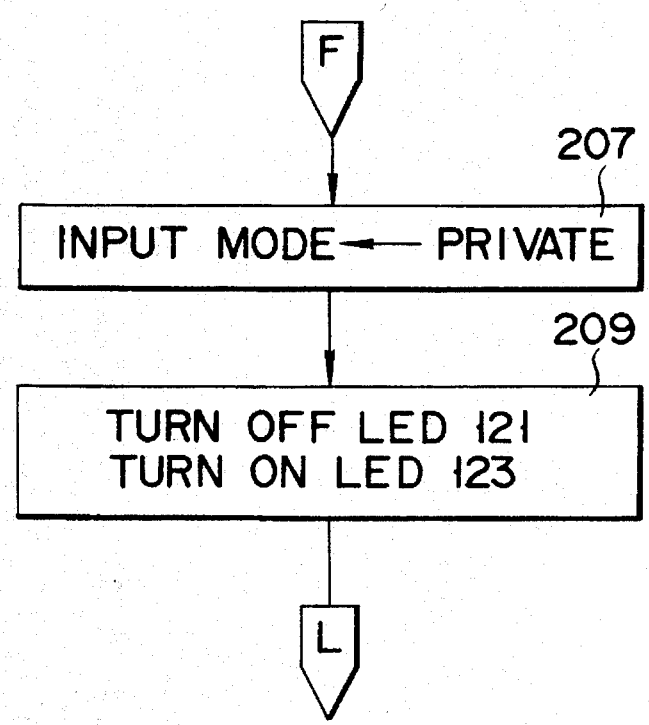
Figure 12H:
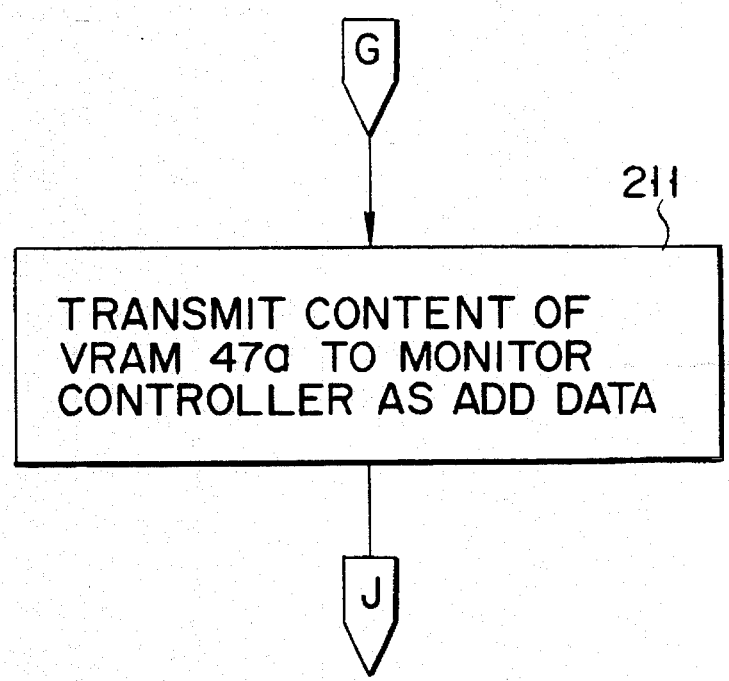
Figure 12I:
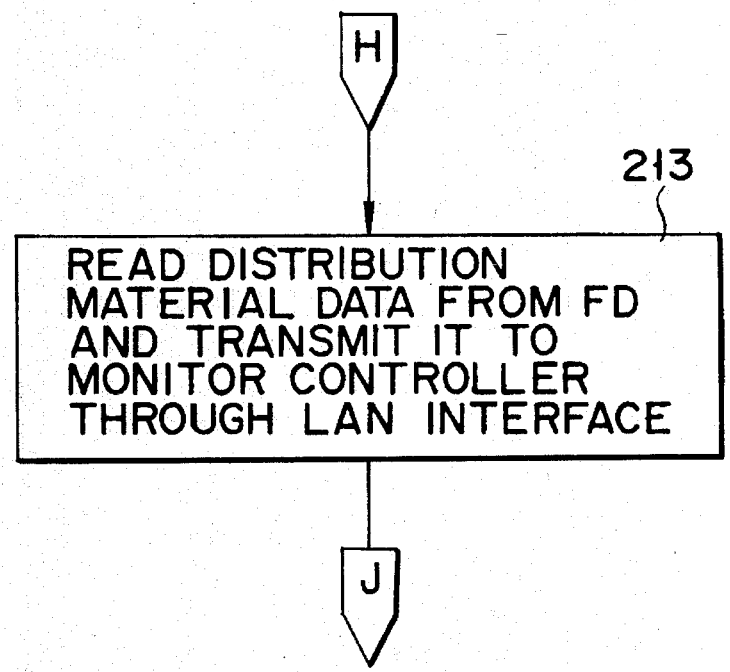

FIGS. 11A through 11C show another embodiment wherein when data (public data) displayed on the monitor 21 is designated by a pen on each terminal, a pointing cursor unique to each terminal is prepared, so that other participants can easily identify a terminal (meeting participant) which designates the data.

In the proceeding of the meeting, when a participant designates public data using a pen at his or her terminal, a unique cursor prepared for each terminal (e.g., a cursor with a terminal number or an initial of a participant) is displayed on the monitor 21 and LCDs of all the terminals (FIGS. 11A through 11C). FIGS. 11A through 11C exemplify a case wherein a terminal number is employed in a cursor unique to a terminal. FIG. 11A shows a display screen of the monitor 21, and FIGS. 11B and 11C respectively show display screens of first and second terminals. In FIGS. 11B and 11C, cursors of the first and second terminals are displayed at positions designated by the corresponding pens. The monitor screen shown in FIG. 11A represents that "2. BACKGROUND" is designated by the first terminal, and "5. SCHEDULE" is designated by the second terminal. Image patterns of such cursors are stored in the ROM 59, and the image pattern corresponding to designated data (e.g., a terminal number) is read out and displayed.

FIGS. 12A through 12I are some of flow charts showing the operations of the second embodiment. Note that the same reference numerals in FIGS. 12A through 12I denote the same steps as in FIGS. 9A through 9I, and a detailed description thereof will be omitted. In step 145 in FIG. 12B, when the pen tip switch is OFF, i.e., when coordinate data is cursor data, the CPU 55 adds terminal data (data for distinguishing each terminal is stored in the ROM 59), and X- and Y-coordinate data in the input data buffer of the RAM 57. A data architecture is as follows:

1st byte: Data indicating cursor data

2nd byte: Terminal number

3rd, 4th bytes: X-coordinate data

5th, 6th bytes: Y-coordinate data

When display data is coordinate data and cursor data (step 164 in FIG. 12C), a cursor displayed so far is erased, and is displayed at the coordinate position of new display data. The cursor pattern data is determined in accordance with a terminal, and is stored in the ROM 59 (similarly, cursor patterns according to terminal numbers are stored in the ROM 83 of the monitor controller 23). In this case, a cursor pattern according to a terminal number is used. The cursor is displayed and erased by logically XORing cursor pattern data on the VRAM 47. FIGS. 11A through 11C exemplify the cursor patterns.

Figure 13:
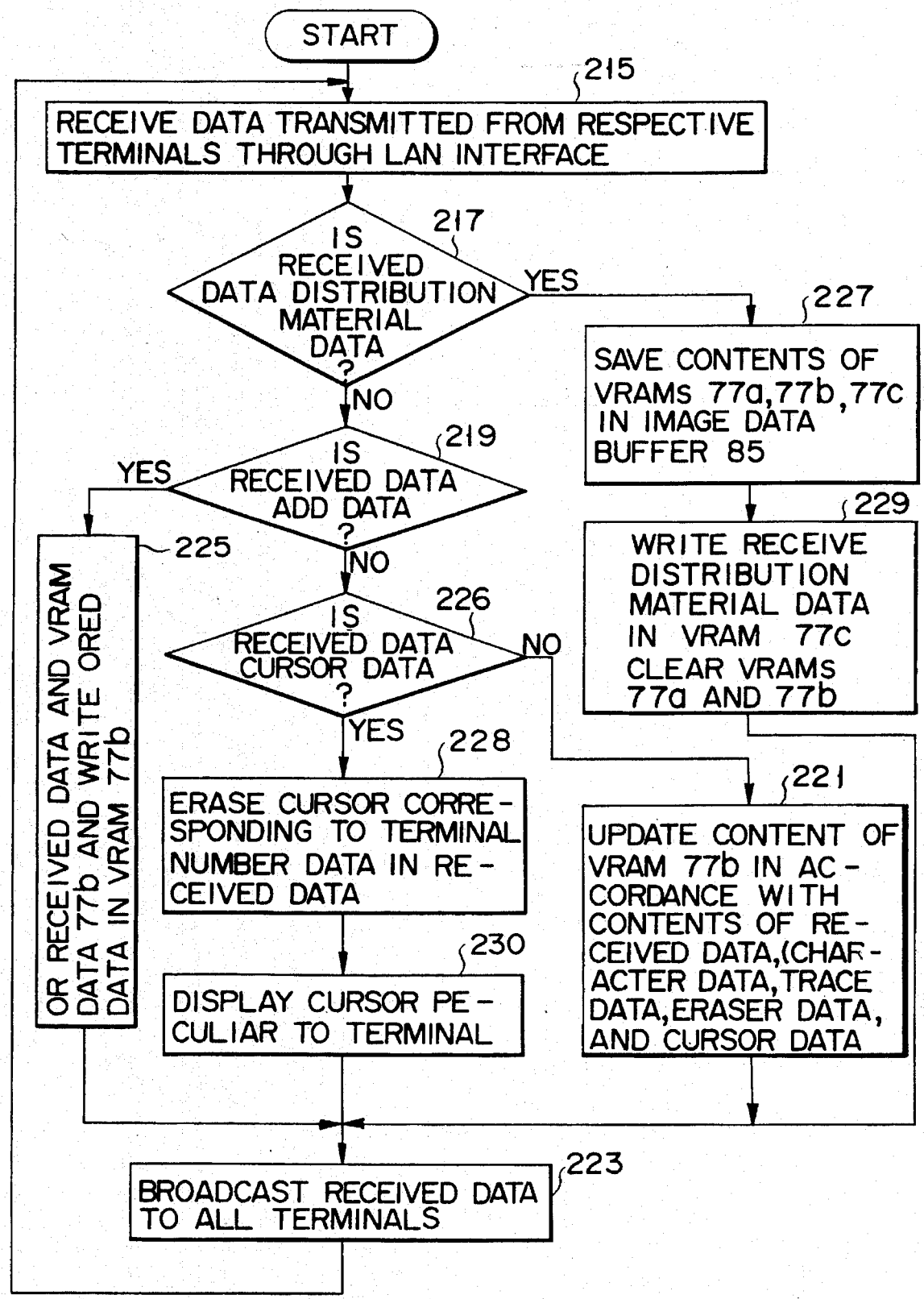
FIG. 13 is a flow chart showing an operation of a monitor controller in the second embodiment.

In the flow chart showing the operation of the monitor controller 23 shown in FIG. 13, in step 226, it is checked if data received from a terminal is cursor data. If YES in step 226, a cursor displayed so far is erased in step 228. In step 230 (FIG. 13), an image pattern of a cursor corresponding to a terminal number in the received cursor data is read out from the ROM 83, and is displayed at a position corresponding to X- and Y-coordinate data of the large size monitor 21.

FIGS. 14 through 17B show the third embodiment of the present invention.

In this embodiment, when a given participant inputs and displays his or her opinion on the public large size screen 21, or when he points a screen with a cursor to explain data, if he does not want that other participants to input and display data on the large size monitor at the same time to interrupt presentation or explanation of his opinion, he depresses a lock key to inhibit other participants from inputting and displaying data on the large size monitor.

According to this embodiment, a key for instructing to allow only his own terminal to transfer display data to a controller of the large size monitor via a LAN, i.e., for instructing to lock the large size monitor so as to inhibit other terminals from displaying data on the large size monitor is arranged on each terminal. In addition, a means for, when the key is depressed, transferring the lock data to other terminals via the LAN is arranged in each terminal. Furthermore, a means for inhibiting the terminals which received the lock data from transferring data input at the terminals to the monitor controller 23 until the large size monitor is unlocked is arranged in each terminal. Thus, the number of terminals which can simultaneously input display data to the large size monitor 21 can be limited to one, as needed.

This embodiment will be described below with reference to FIGS. 14 through 17B. Note that the same reference numerals in FIGS. 15A through 15K denote the same steps as in FIGS. 9A through 9I, and a detailed description thereof will be omitted.

Figure 14:
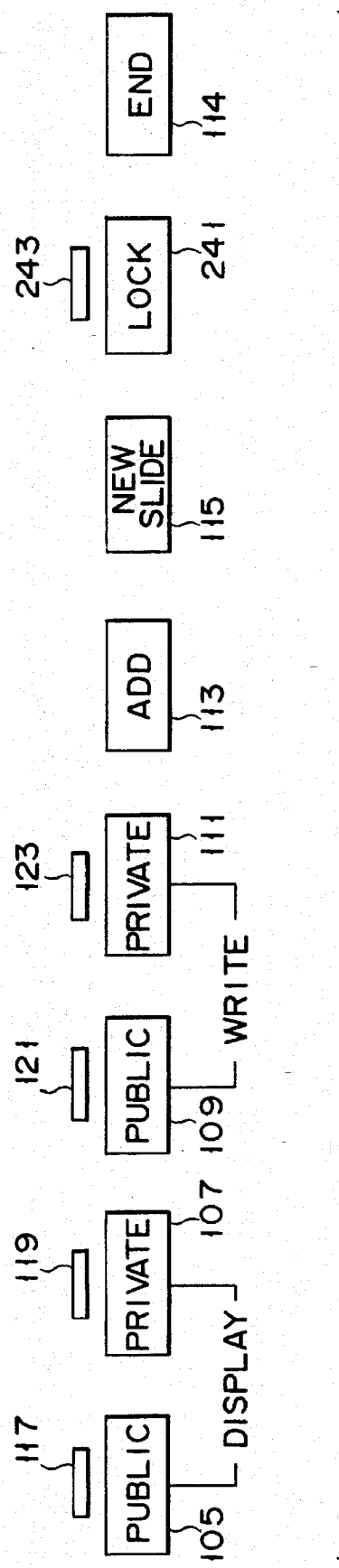
FIG. 14 is a view showing an arrangement of a keyboard according to the third embodiment of the present invention.

In this embodiment, as shown in FIG. 14, a lock key 241, and an LED 243 indicating a locked state are arranged on the keyboard 41.

[6] Lock Large Size Monitor

Figure 15A:
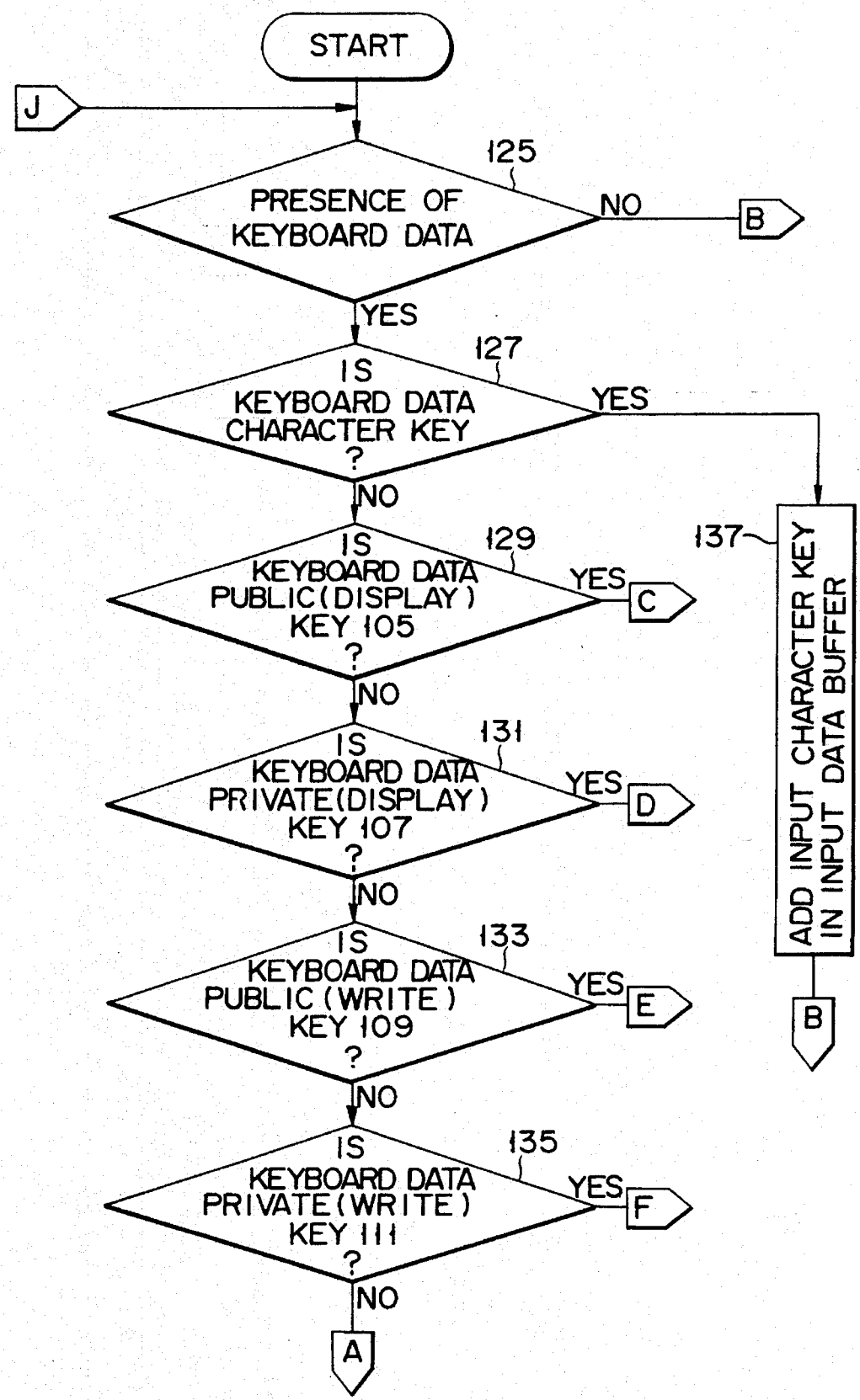
Figure 15B:
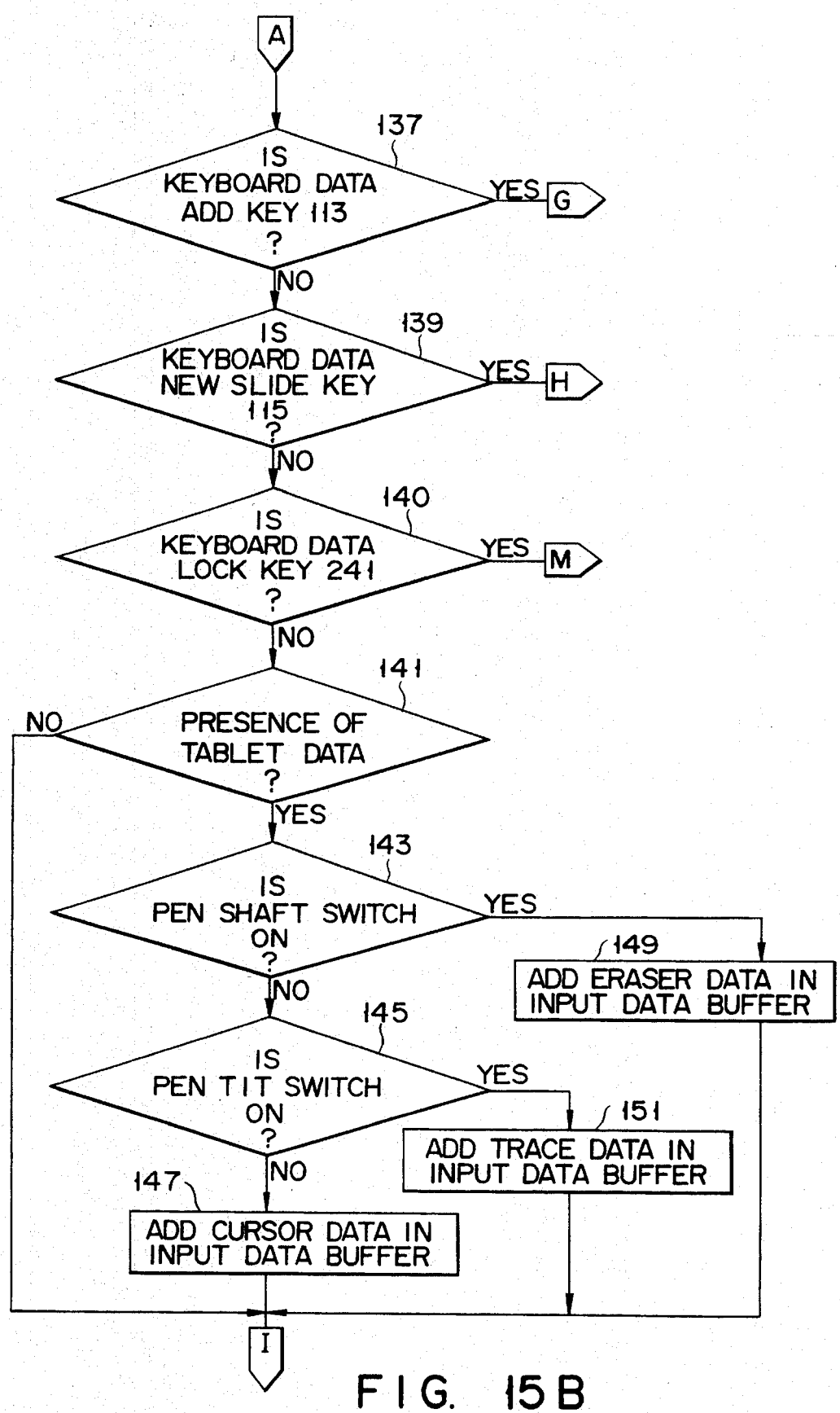
Figure 15D:
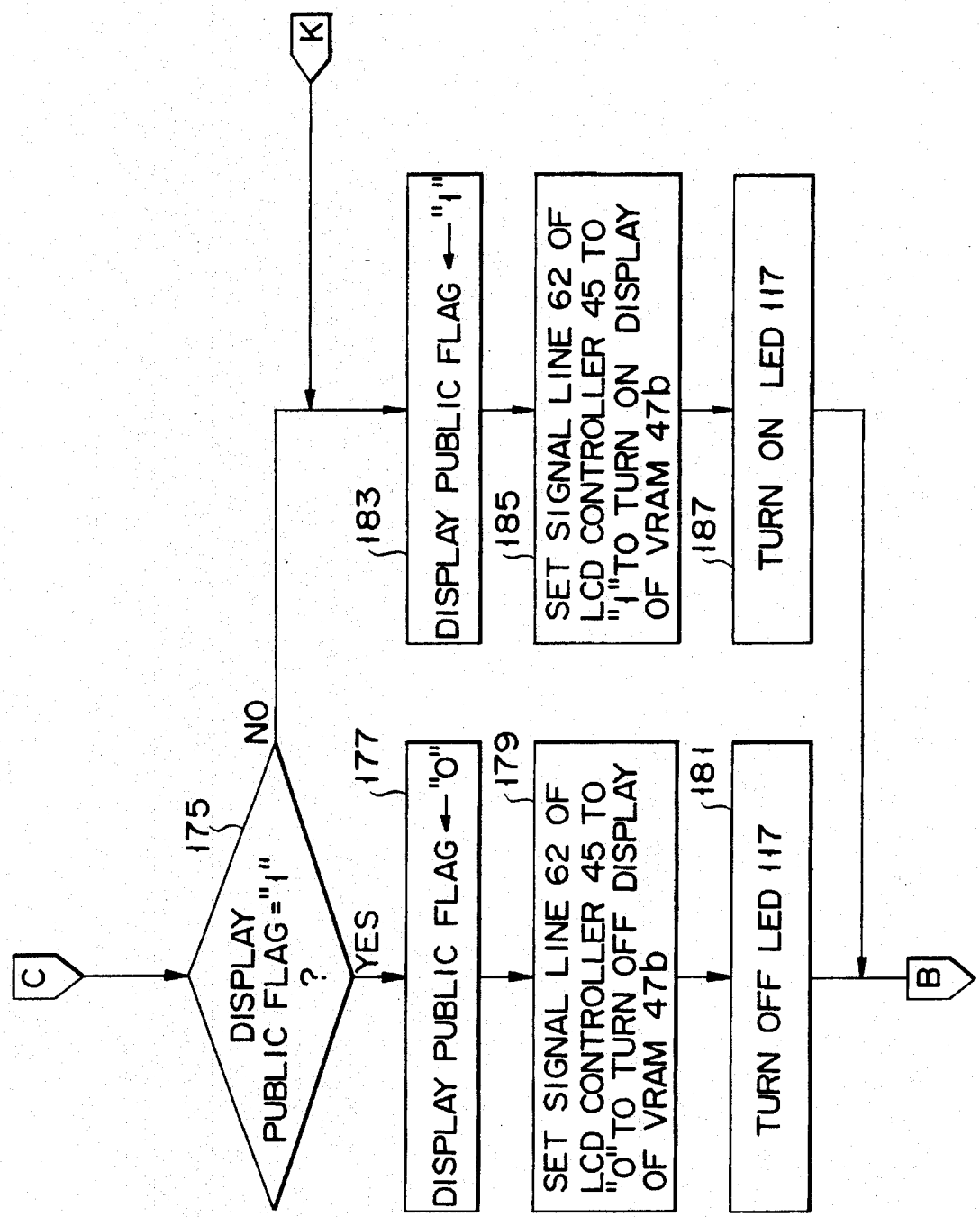
Figure 15E:
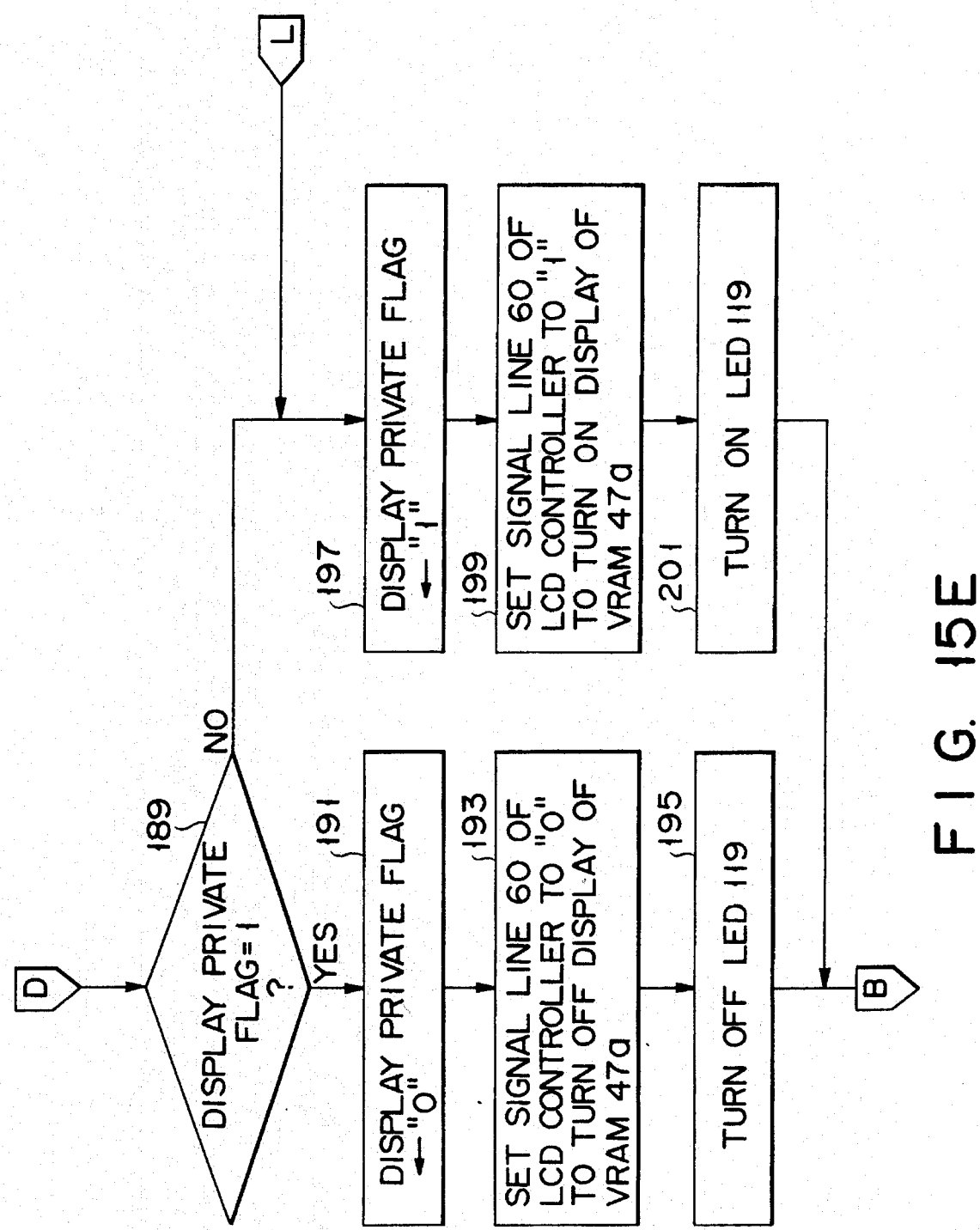
Figure 15J:
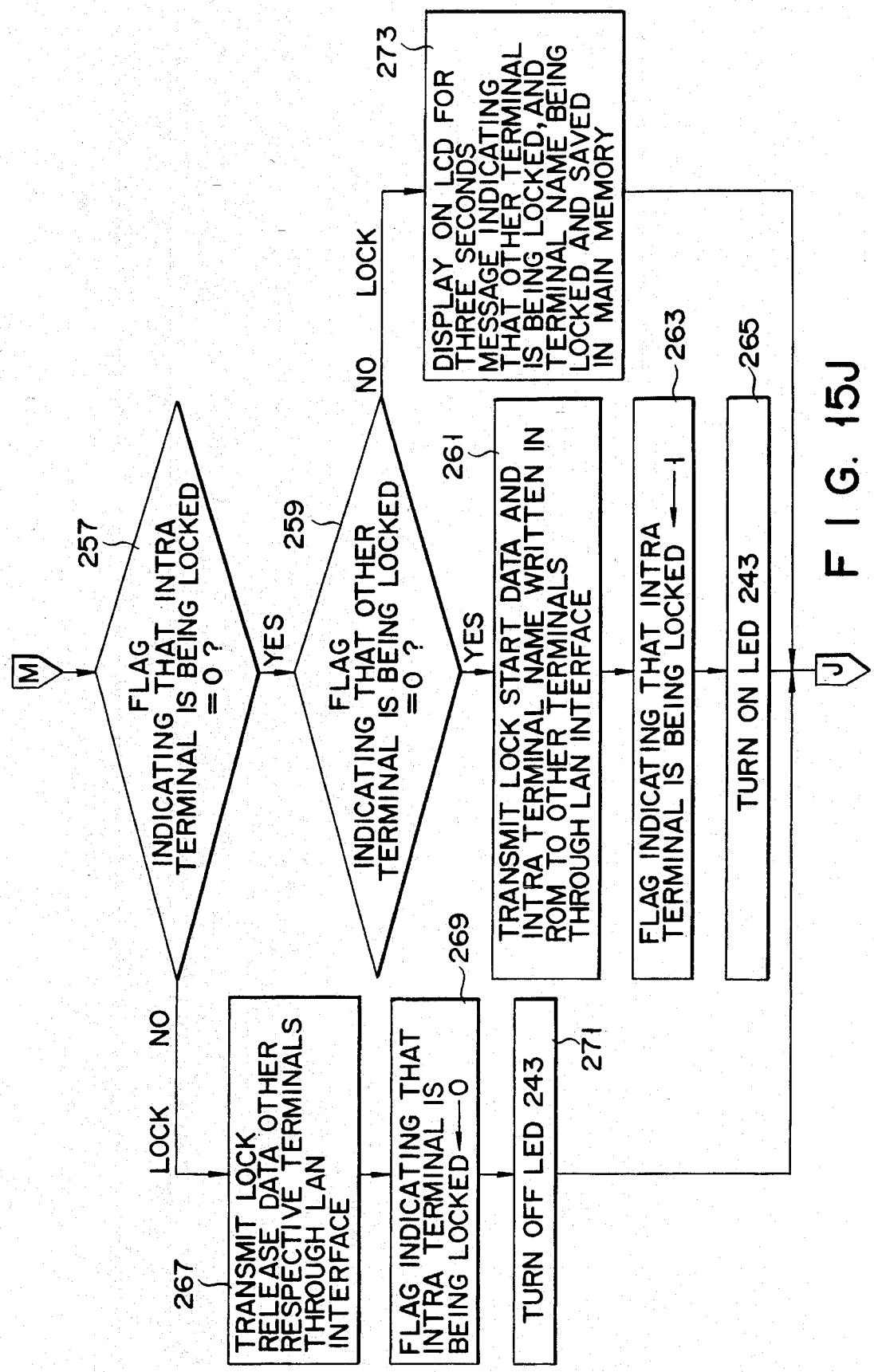

If it is determined in step 140 in FIG. 15B that the lock key 241 is depressed, it is checked in step 257 in FIG. 15J if a flag indicating that an intra terminal is being locked is "0". The flag indicating that the intra terminal is being locked is allocated in the main memory 57. When the terminal locks the large size monitor to inhibit other terminals from writing display data on the large size monitor, this flag is set to be "1"; otherwise, it becomes "0".

If it is determined in step 257 that the flag is "0", the CPU 55 checks in step 259 if a flag indicating that another terminal is being locked is "0". The flag indicating that another terminal is being locked is allocated in the main memory 57. When the terminal locks the large size monitor to inhibit the intra terminal from writing display data on the large size monitor, this flag is set to be "1"; otherwise, it becomes "0".

If the intra terminal has not locked the large size monitor 21 (step 257), a lock operation of the large size monitor is executed.

Figure 17A:
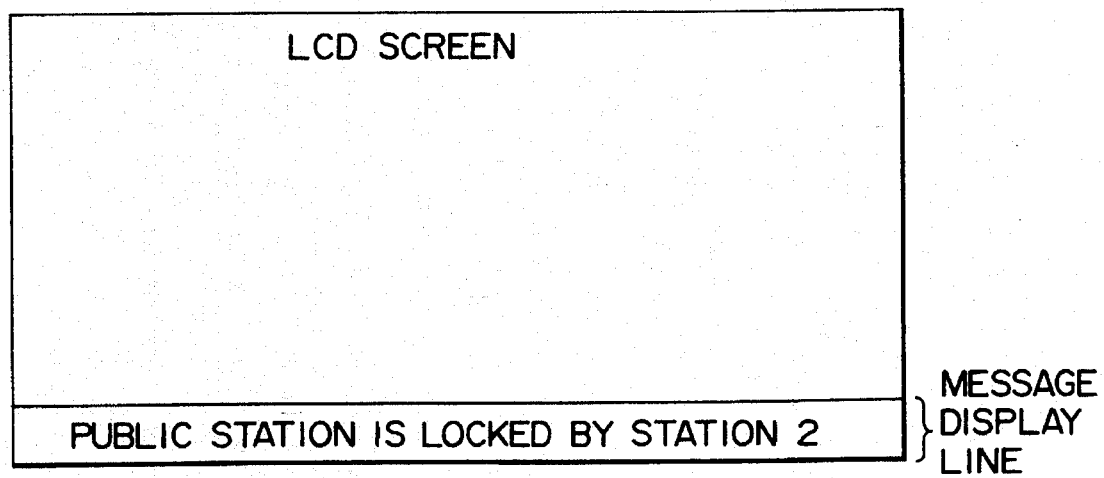
FIGS. 17A and 17B respectively show LCD screens when a screen is locked and unlocked.
Figure 17B:
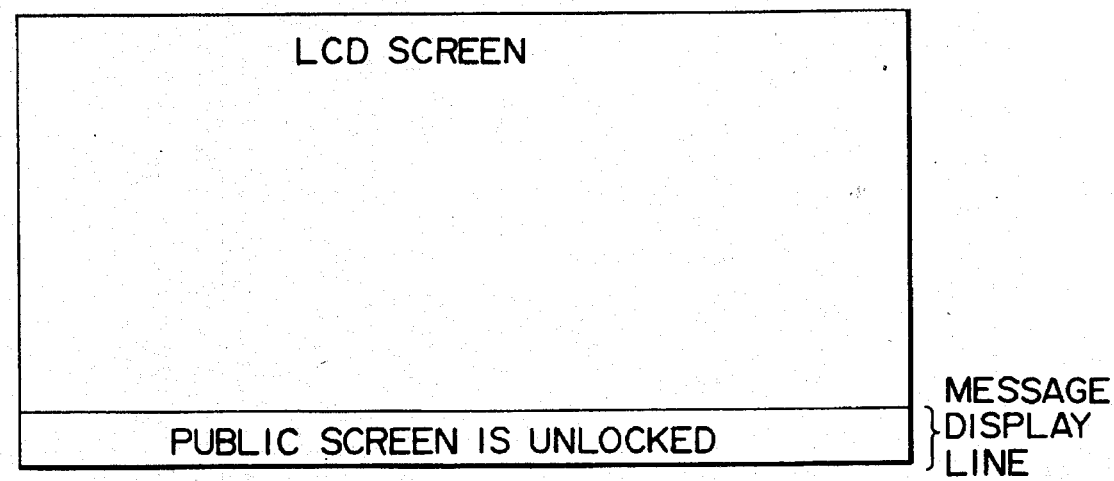

If another terminal has already locked the large size monitor 21 (step 259), as shown in FIG. 17A, a message indicating that another terminal is locking the large size monitor, and a message indicating a locked terminal name saved in step 283 are displayed on the LCD 43 (step 273). In the monitor controller 23, the signal line 62 of the CRT controller 75 is always "1", and the content of the public data VRAM 77b is always displayed.

If the large size monitor is not locked by another terminal, lock start data, and a terminal name written in the ROM 59 are transmitted to other terminals via the LAN interface 63 (step 261). In response to the received lock start data, other terminals set the flag indicating that another terminal is being locked to be "1". Furthermore, the flag indicating that the intra terminal is being locked is set, and the LED 243 indicating the locked state is turned on (steps 263 and 265).

Figure 15K:
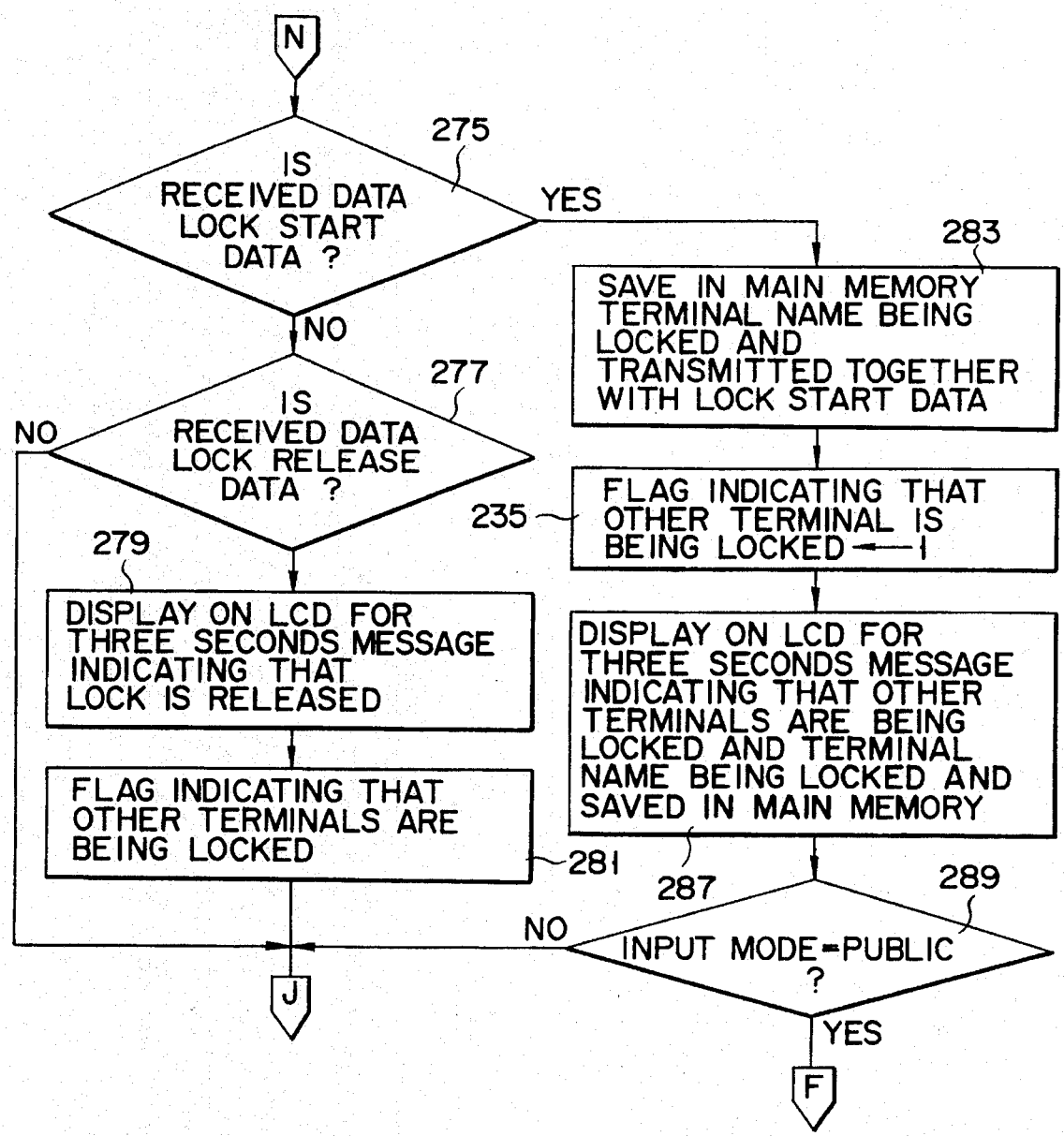

Other terminals receive the lock start data transmitted in step 261 (step 159), and store the transmitted terminal name in their main memories 57 (step 283 in FIG. 15K). Each of these terminals sets the flag indicating that another terminal is being locked (step 285), and a message indicating that another terminal is locking the large size monitor, and a message indicating a locked terminal name saved in step 283 are displayed on the LCD, as shown in FIG. 17A (step 287). In the monitor controller 23, the signal line 62 of the CRT controller 75 is always "1", and the content of the public data VRAM 77b is always displayed.

[7] Unlock Public Screen

When the lock key 241 on the keyboard is depressed (step 140), if the intra terminal has already been locking the large size monitor 21, a lock release (unlock) operation is performed.

The terminal transmits lock release data to other terminals via the LAN interface (step 267), resets the flag indicating that the intra terminal is being locked, and turns off the LED 243 indicating the locked state (steps 269 and 271).

Other terminals receive the lock release data transmitted in step 267 (step 159), and display a message indicating that the screen is unlocked on their LCDs 43 (step 279 in FIG. 15K) (in the monitor controller 23, the signal line 62 of the CRT controller 75 is always "1", and the content of the public data VRAM 77b is always displayed). In addition, these terminals reset the flag indicating that another terminal is being locked (step 281).

If it is determined in step 133 in FIG. 15A that the PUBLIC (WRITE) key 109 is depressed, and if the CPU 55 determines in step 202 that the flag indicating that another terminal is being locked is ON, it causes the LCD 43 to display a message indicating that another terminal is being locked, and a locked terminal name saved in the main memory in step 283 for three seconds (step 204). Note that a message indicating lock data is displayed by writing message data at a message display position of the VRAM 47c. In this case, VRAM data located at the message display position before the message data is written in the VRAM 47c is saved in the main memory 57. The displayed message data is automatically erased after an elapse of a predetermined period of time (e.g., three seconds) from the beginning of display. In this case, the erasing operation is executed by writing back the VRAM data saved in the main memory 57 to the message display position of the VRAM 47c (note that the program is not stopped at that step but progresses during message data display).

If it is determined in step 137 in FIG. 15B that input key data is ADD key data, the CPU 55 checks in step 251 if the flag indicating that another terminal is being locked is ON. If YES in step 251, a message indicating that another terminal is being locked, and a locked terminal name saved in the main memory 57 are displayed for three seconds in step 255.

If it is determined in step 139 in FIG. 15B that the NEW SLIDE key is depressed, the CPU 55 checks in step 245 in FIG. 15I if the flag indicating that another terminal is being locked is ON. If YES in step 245, a message indicating that another terminal is being locked, and a locked terminal name saved in the main memory are displayed for three seconds in step 247.

On the other hand, if the monitor controller 23 determines in decision steps 217, 219, and 220 in the flow chart shown in FIG. 16 that received data is none of distribution material data, ADD data, character data, trace data, eraser data, and cursor data, it determines that received data is lock data, and the flow returns to step 215. Thus, a display state of the large size monitor 21 is left unchanged.

In each of the above embodiments, public data is sent from a given terminal to the monitor controller 23 via the LAN interface 63, and is then broadcasted from the monitor controller to all the terminals. Alternatively, a given terminal may broadcast public data to all the terminals.

In each of the above embodiments, the large size monitor and the monitor controller are arranged, but they are not always necessary. For example, if a meeting is conducted in one meeting room, the large size monitor is convenient. However, if a meeting is performed among local service stations, the large size monitor is unnecessary. In this case, public data and distribution material data can be displayed using a display device of each terminal without using the large size monitor.

In each of the above embodiment, the VRAMs 47 include the individual data VRAM 47a, the public data VRAM 47b, and the distribution material VRAM 47c. However, the VRAMs may include only the individual data VRAM 47a and the public data VRAM 47b.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An information processing system comprising:

a plurality of information processing apparatuses each comprising an input device, a display device, and a communication device for performing a data communication with other information processing apparatuses;

a data communication path for performing a data communication among the communication devices of said plurality of information processing apparatuses;

means for transmitting information input by the input device of an arbitrary one of said plurality of information processing apparatuses to all the information processing apparatuses in real time via said data communication path;

means for displaying the transmitted information on the display devices of said information processing apparatuses;

each of said information processing apparatuses comprising means for discriminating, in the information input from the input device of the arbitrary information processing apparatus, first information which is transmitted to said information processing apparatuses via said data communication path and is displayed on the display devices of said information processing apparatuses and second information which is not transmitted to other information processing apparatuses, and is displayed on only the display device of the information processing apparatus having the input device at which the second information is input;

each of said information processing apparatuses further comprising:

first storage means for storing the first information;

second storage means for storing the second information; and means for selecting whether or not first display information stored in said first storage means and second display information stored in said second storage means are displayed, or whether the first display information stored in said first storage means and the second display information stored in said second storage means are added together and the added together display information is displayed, the added together display information comprising stored data of the first and second display information and being created by means of a display controller.

2. An information processing system comprising:

a plurality of information processing apparatuses each comprising an input device, a display device, and a communication device for performing a data communication with other information processing apparatuses;

an information display apparatus comprising a display device, and a communication device for performing a data communication with said information processing apparatuses;

a data communication path for performing a data communication among the communication devices in said plurality of information processing apparatuses and the communication device of said information display apparatus;

means for transmitting information input by the input device of an arbitrary one of said plurality of information processing apparatuses to all the information processing apparatuses and said information display apparatus in real time via said data communication path; and means for displaying the transmitted information on the display devices of said information processing apparatuses and the display device of said information display apparatus in real time;

each of said information processing apparatuses comprising means for discriminating, in the information input from the input device of the arbitrary information processing apparatus, first information which is transmitted to said information processing apparatuses or said information display apparatus via said data communication path and is displayed on the display devices of said information processing apparatuses or the display device of said information display apparatus and second information which is not transmitted to other information processing apparatuses and said information display apparatus, and is displayed on only the display device of the information processing apparatus having the input device at which the second information is input;

each of said information processing apparatuses further comprising:

first storage means for storing the first information;

second storage means for storing the second information; and means for selecting whether or not first display information stored in said first storage means and second display information stored in said second storage means are displayed, or whether the first display information stored in said first storage means and the second display information stored in said second storage means are added together and the added together display information is displayed, the added together display information comprising stored data of the first and second stored display information and being created by means of a display controller.

3. A system according to claim 1, wherein the input device and the display device comprise an integrated input/display device prepared by stacking a coordinate input device and a display device.

4. A system according to claim 2, wherein the input device and the display device prepared by stacking a coordinate input device and a display device.

5. A system according to claim 1, further comprising means for transmitting information stored in said first storage means to other information processing apparatuses via said data communication path, and wherein each of said information processing apparatuses further comprises means for adding together the transmitted information with first display information stored in its first storage means, and storing the added together information in its first storage means.

6. A system according to claim 2, further comprising means for transmitting information stored in said first storage means to the information processing apparatuses or said information display apparatus via said data communication path, and wherein each of said information processing apparatuses or said information display apparatus further comprises means for synthesizing the transmitted information with information stored in said second storage means, and storing the synthesized information in said second storage means.

7. A system according to claim 1, wherein the information which is input by the input device of the arbitrary one of said plurality of information processing apparatuses, is transmitted to all the information processing apparatuses via said data communication path in real time, and is displayed on the display devices of said information processing apparatuses includes pointing data for designating a position in the display device.

8. A system according to claim 2, wherein the information which is input by the input device of the arbitrary one of said plurality of information processing apparatuses, is transmitted to all the information processing apparatuses and said information display apparatus via said data communication path in real time, and is displayed on the display devices of said information processing apparatuses and the display device of said information display apparatus includes pointing data for designating a position in the display device.

9. A system according to claim 1, wherein each of said information processing apparatuses further comprises:

means for, when data input by the information processing apparatus is transferred to other information processing apparatuses, adding data for identifying a user of the information processing apparatus to original data to be transferred; and means for, when data transferred from another information processing apparatus is displayed, displaying information indicating the information processing apparatus at which the data is input or the user of the information processing apparatus on the display device in accordance with the identification data added to the transferred data.

10. A system according to claim 2, wherein each of said information processing apparatuses further comprises means for, when data input by the information processing apparatus is transferred to other information processing apparatuses or said information display apparatus, adding data for identifying a user of the information processing apparatus to original data to be transferred, and each of said information processing apparatuses and said information display apparatus further comprises means for, when data transferred from another information processing apparatus is displayed, displaying information indicating the information processing apparatus at which the data is input or the user of the information processing apparatus on the display device in accordance with the identification data added to the transferred data.

11. A system according to claim 1, wherein each of said information processing apparatuses comprises means for inhibiting or permitting transfer of information input by the input device of another information processing apparatus to the information processing apparatuses other than the information processing apparatus at which the information is input.

12. A system according to claim 2, wherein each of said information processing apparatuses comprises means for inhibiting or permitting transfer of information input by the input device of another information processing apparatus to the information processing apparatuses other than the information processing apparatus at which the information is input or said information display apparatus.

13. A system according to claim 11, wherein each of said information processing apparatuses further comprises:

means for, when input information is inhibited from being transferred to other information processing apparatuses, obtaining data for identifying the information processing apparatus which inhibits transfer; and means for displaying information indicating the information processing apparatus which inhibits transfer on the display device on the basis of the data.

14. A system according to claim 12, wherein each of said information processing apparatuses further comprises:

means for, when input information is inhibited from being transferred to other information processing apparatuses or said information display apparatus, obtaining data for identifying the information processing apparatus which inhibits transfer; and means for displaying information indicating the information processing apparatus which inhibits transfer on the display device on the basis of the data.

15. An information processing system comprising:

a plurality of information processing apparatuses, each of said information processing apparatuses including:

an input device for inputting data;

a display device for displaying data;

a communication device for performing a data communication with other information processing apparatuses;

first memory means for storing data shared by said plurality of information processing apparatuses;

second memory means for storing individual data to be used internally of each information processing apparatus; and memory management means for individually managing said first and second memory means;

a data communication path for performing a data communication among the communication devices of said plurality of information processing apparatuses;

means for transmitting shared data, input by the input device of an arbitrary one of said plurality of information processing apparatuses and stored in said first memory means, to all the information processing apparatuses in real time via said data communication path; and means for displaying the transmitted data on the display devices of said information processing apparatuses.

16. An information processing system comprising:

a plurality of information processing apparatuses, each of said information processing apparatuses including:

an input device for inputting data;

a display device for displaying data;

a communication device for performing a data communication with other information processing apparatuses;

first memory means for storing data shared by said plurality of information processing apparatuses;

second memory means for storing individual data to be used internally of each information processing apparatus; and memory management means for individually managing said first and second memory means; an information display apparatus including:

a display device for displaying data;

first memory means for storing data shared by said plurality of information processing apparatuses;

second memory means for storing individual data used by an intra information processing apparatus;

memory management means for individually managing said first and second memory means; and a communication device for performing a communication with said information processing apparatuses;

a data communication path for performing a data communication among the communication devices of said plurality of information processing apparatuses and the communication device in said information display apparatus;

means for transmitting shared data, input by the input device of an arbitrary one of said plurality of information processing apparatuses and stored in said first memory means, to all the information processing apparatuses and said information display apparatus in real time via said data communication path; and means for displaying the transmitted data on the display devices of said information processing apparatuses and the display device of said information display apparatus.

* * * * *